United States Patent
Przybysz et al.

(10) Patent No.: US 8,121,583 B2
(45) Date of Patent: Feb. 21, 2012

(54) METHODS AND APPARATUS FOR PUSH TO TALK AND CONFERENCING SERVICE

(75) Inventors: Hubert Przybysz, Stockholm (SE); Bipin Thomas, Frisco, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 414 days.

(21) Appl. No.: 11/988,368

(22) PCT Filed: Jul. 8, 2005

(86) PCT No.: PCT/EP2005/053283
§ 371 (c)(1),
(2), (4) Date: Aug. 10, 2009

(87) PCT Pub. No.: WO2007/006343
PCT Pub. Date: Jan. 18, 2007

(65) Prior Publication Data
US 2009/0298487 A1    Dec. 3, 2009

(51) Int. Cl.
*H04M 3/42* (2006.01)
*H04B 1/38* (2006.01)

(52) U.S. Cl. .......... 455/416; 455/90.2; 455/509

(58) Field of Classification Search .......... 455/90.2, 455/416, 509–518; 370/202, 252, 508–519, 370/389
See application file for complete search history.

(56) References Cited

U.S. PATENT DOCUMENTS

| | | | | |
|---|---|---|---|---|
| 4,553,263 | A * | 11/1985 | Smith et al. | 455/509 |
| 5,572,674 | A | 11/1996 | Ernst | |
| 6,724,732 | B1 * | 4/2004 | Abrams et al. | 370/252 |
| 2002/0150091 | A1 | 10/2002 | Lopponen et al. | |
| 2004/0047461 | A1 | 3/2004 | Weisman et al. | |
| 2006/0281482 | A1 | 12/2006 | Yoshida et al. | |

FOREIGN PATENT DOCUMENTS

| | | |
|---|---|---|
| EP | 1734721 | 9/2007 |
| JP | 2003-526275 | 9/2003 |
| JP | 2007-028596 | 2/2007 |

(Continued)

OTHER PUBLICATIONS

International Search Report for PCT/EP2005/053283 mailed Apr. 5, 2006.

(Continued)

*Primary Examiner* — Kent Chang
*Assistant Examiner* — Kashif Siddiqui
(74) *Attorney, Agent, or Firm* — Nixon & Vanderhye P.C.

(57) ABSTRACT

A method is provided for use in a push to talk or conferencing type service involving a terminal and a controller, comprising, in response to the controller deciding to grant a talk request received from the terminal, sending to the terminal an indication of an allowed talk time for a granted talk burst, the indication being for use at the terminal to monitor the remaining allowed talk time during the granted talk burst. There is also provided a method for use in a push to talk or conferencing type service involving a terminal and a controller, comprising, in response to the controller deciding to grant a talk request received from the terminal, monitoring the remaining allowed talk time at the controller using an allowed talk timer and starting the allowed talk timer at the controller in response to receipt of talk burst data from the terminal.

53 Claims, 22 Drawing Sheets

FOREIGN PATENT DOCUMENTS

WO    WO 01/67674    9/2001

OTHER PUBLICATIONS

International Preliminary Report on Patentability for PCT/EP2005/053283 dated Oct. 15, 2007.
Summary of Japanese Official Action, Feb. 28, 2011, in corresponding Japanese Application No. 2008-519805.
European Communication, Jan. 24, 2011, in corresponding European Application No. 05 760 945.5.
Connect Systems Inc., Model TP-163, Shared Repeater Tone Panel, User's Instruction Manual, Version 1.01, XP007916813, 1996, pp. 1-34.
Open Mobile Alliance, PoC User Plane Version, Candiate Version 1.0—Apr. 28, 2005, OMA-TS_PoC-UserPlane-V1_0-20050428-C, pp. 1-161.
Camarillo et al., Internet Engineering Task Force, XCON Working Group, The Binary Floor Control Protocol (BFCP), draft-ietf-xcon-bfcp-04.txt, May 4, 2005, pp. 1-71.

* cited by examiner

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 0 0 0 1|   PT=APP=204  |            length=2            |
+-+-+-+-+-+-+-+-+-+-+-+-+-+-+-+-+-+-+-+-+-+-+-+-+-+-+-+-+-+-+-+-+
|      SSRC of PoC Server performing the Controlling PoC Function |
+-+-+-+-+-+-+-+-+-+-+-+-+-+-+-+-+-+-+-+-+-+-+-+-+-+-+-+-+-+-+-+-+
|                            name=PoC1                            |
+-+-+-+-+-+-+-+-+-+-+-+-+-+-+-+-+-+-+-+-+-+-+-+-+-+-+-+-+-+-+-+-+
|Participants= x|         spare                                   |
+-+-+-+-+-+-+-+-+-+-+-+-+-+-+-+-+-+-+-+-+-+-+-+-+-+-+-+-+-+-+-+-+
```

METHODS AND APPARATUS FOR PUSH TO TALK AND CONFERENCING SERVICE

This application is the U.S. national phase of International Application No. PCT/EP2005/053283, filed 8 Jul. 2005, which designated the U.S. The entire contents of that application is hereby incorporated by reference.

TECHNICAL FIELD

The present invention relates to methods and apparatus for use in a push to talk or conferencing service, for example a so-called push to talk over cellular service.

BACKGROUND

Walkie-talkie type services have long proved popular amongst users who wish to communicate brief messages quickly between one another. Conventionally, such services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardising suitable protocols which will allow inter-network operability for Warlike-Talkie services offered over cellular networks. The service established by the various standards is known as Push to talk Over cellular (PoC). PoC proposes that associated speech data will be transported over a packet switched access network. In the case of GSM and UMTS, this will be the general packet radio service (GPRS) access network. In other network architectures, analogous packet switched access networks will be utilised for transporting talk data. Push to Talk services may also be offered over circuit switched access networks, although this is not the preferred option.

The Push to talk over Cellular (PoC) system is typically implemented on GSM/GPRS networks and which makes use of the IP Multimedia Subsystem (IMS) standardised by the 3$^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. A PoC server is located within the IMS or is attached thereto, and implements the functionality for setting up and controlling PoC sessions.

Existing push-to-talk (PTT) and conferencing systems typically use a control mechanism to grant one of the users the right to speak while other users in the communication are denied such right and are in listening mode. Such control mechanism is typically referred to as floor control, talker arbitration, talk burst control, etc. For example, the Open Mobile Alliance is currently working on a specification of Push-To-Talk over Cellular (PoC) system, which includes Talk Burst Control Protocol (TBCP).

To request the right to speak on behalf of the user the terminal typically sends a request message to the controller. The controller typically responds either granting or rejecting the request. The controller typically restricts the time the user is allowed to talk, typically by starting an allowed talk timer when it grants the request, and uses some mechanism to interrupt the user, typically by sending a revoke message to the user's terminal or by simply not forwarding the user's media. The user who is interrupted by the controller is typically penalised by the controller in some way, e.g. by not granting the user the right to speak for a certain period of time.

The typical operation of a PTT system in this regard is depicted in the FIG. 1 of the accompanying drawings.

Note that the messages depicted here do not refer to a particular protocol or implementation but are used to depict the concept of transferring the information between the terminal and the controller.

OMA-PoC User Plane specification (Open Mobile Alliance, PoC User Plane Version, Candidate Version 1.0—28 Apr. 2005, OMA-TS_PoC-UserPlane-V1_0-20050428-C) with the Talk Burst Control Protocol is a good example of these mechanisms. TBCP state machines of the terminal and the controller for the basic operation are provided respectively in FIGS. 2 and 3 of the accompanying drawings. FIG. 2 shows an OMA PoC Client state transition diagram for basic operation. FIG. 3 shows an OMA PoC Server state transition diagram for normal Talk Burst operation to the PoC Client. An OMA-PoC encoding of the TB_Granted message (TBCP Talk Burst Granted message) is provided in FIG. 4 of the accompanying drawings. Another example is the Binary Floor Control Protocol (BFCP) that is currently being specified by the IETF XCON Working Group (Internet Engineering Task Force, XCON Working Group, The Binary Floor Control Protocol (BFCP), draft-ietf-xcon-bfcp-04.txt).

SUMMARY

A first example method for use in a push to talk or conferencing type service involving a terminal and a controller comprises in response to the controller deciding to grant a talk request received from the terminal, sending to the terminal an indication of an allowed talk time for a granted talk burst, the indication being for use at the terminal to monitor the remaining allowed talk time during the granted talk burst.

The method may comprise receiving the talk request at the controller and deciding whether to grant the talk request.

The method may comprise determining the allowed talk time at the controller.

The indication may comprise timing information relating to the duration of the allowed talk time.

The indication may comprise timing information relating to the remaining duration of the allowed talk time at or near the time of sending the indication.

The indication may comprise timing information relating to the end of the allowed talk time.

The terminal and controller may have at least some degree of timing synchronisation between them.

The method may comprise sending a granted message from the controller to the terminal to indicate the granting of the talk request.

The method may comprise including the indication in the granted message.

The method may comprise monitoring the remaining allowed talk time at the terminal.

The method may comprise monitoring the remaining allowed talk time at the terminal using an allowed talk timer.

The method may comprise initialising the allowed talk timer at the terminal based on the received indication.

The method may comprise initialising the allowed talk timer at the terminal to watch for the end of the allowed talk time based on the received timing information.

The method may comprise initialising the allowed talk timer at the terminal to measure a duration of time based on the received timing information.

The method may comprise starting the allowed talk timer at the terminal substantially at the same time as starting to send talk burst data to the controller.

The method may comprise starting the allowed talk timer at the terminal in response to receipt of the granted message.

The method may comprise monitoring the remaining allowed talk time at the controller.

The method may comprise monitoring the remaining allowed talk time at the controller using an allowed talk timer.

The method may comprise initialising the allowed talk timer at the controller to watch for the end of the allowed talk time.

The method may comprise initialising the allowed talk timer at the controller to measure a duration of time.

The method may comprise starting the allowed talk timer at the controller in response to receipt of talk burst data from the terminal.

The method may comprise starting the allowed talk timer at the controller at substantially the same time as sending the granted message.

The method may comprise sending the talk request from the terminal to the controller.

The method may comprise re-sending the talk request following a predetermined period of time during which no response to the talk request is received from the controller.

The method may comprise re-sending the granted message following receipt of the re-sent talk request.

The indication in the re-sent grant message may be determined from the remaining allowed talk time monitored at the controller at or near the time of re-sending the grant message.

The method may comprise indicating the remaining allowed talk time monitored at the terminal to a user of the terminal.

The method may comprise indicating expiry of the remaining allowed talk time monitored at the terminal to a user of the terminal.

The method may comprise sending a release message from the terminal to the controller in response to expiry of the remaining allowed talk time monitored at the terminal.

The method may comprise making a latency adjustment to the remaining talk time monitored at the terminal.

The method may comprise making the latency adjustment to the remaining talk time monitored at the terminal in dependence upon an estimation of at least part of a roundtrip delay between the terminal and the controller.

The method may comprise making a latency adjustment to the remaining talk time monitored at the controller.

The method may comprise making the latency adjustment to the remaining talk time monitored at the controller in dependence upon an estimation of at least part of a roundtrip delay between the terminal and the controller.

The method may comprise estimating the at least part of a roundtrip delay at the terminal.

The method may comprise estimating the at least part of a roundtrip delay at the controller.

The method may comprise using the talk request in the estimation of the at least part of a roundtrip delay.

The method may comprise using the granted message in the estimation of the at least part of a roundtrip delay.

The method may comprise estimating the at least part of a roundtrip delay based on a measurement of the time difference between sending the talk request and receiving the granted message.

The method may comprise, in the case where the talk request is sent more than once, selecting one of these talk requests as a basis for the measurement.

The method may comprise estimating the at least part of a roundtrip delay based on a plurality of such measurements made at different respective times.

The method may comprise using the release message in the estimation of the at least part of a roundtrip delay.

The remaining talk time monitored at the controller may be increased according to the latency adjustment.

The remaining talk time monitored at the terminal may be decreased according to the latency adjustment.

The latency adjustment may be an aggregate downlink and uplink latency adjustment.

The latency adjustment may be an uplink latency adjustment.

In the above-described first example embodiment, "talk" may be replaced by "data transfer", and the data transferred in the data transfer burst comprises for example speech data and/or another type of data.

A second example method for use in a push to talk or conferencing type service involving a terminal and a controller, comprises in response to the controller deciding to grant a talk request received from the terminal, receiving from the controller an indication of an allowed talk time for the granted talk burst, and using the indication to monitor the remaining allowed talk time at the terminal during the granted talk burst.

An example controller for use in a push to talk or conferencing type service, comprises means for sending to a terminal, in response to deciding to grant a talk request received from the terminal, an indication of an allowed talk time for the granted talk burst, the indication being for use at the terminal to monitor the remaining allowed talk time during the granted talk burst.

An example terminal for use in a push to talk or conferencing type service, comprises means for receiving from a controller, in response to the controller deciding to grant a talk request received from the terminal, an indication of an allowed talk time for the granted talk burst, and means for using the indication to monitor the remaining allowed talk time at the terminal during the granted talk burst.

An example method for use in a push to talk or conferencing type service involving a terminal and a controller, comprises in response to the controller deciding to grant a talk request received from the terminal, monitoring the remaining allowed talk time at the controller using an allowed talk timer and starting the allowed talk timer at the controller in response to receipt of talk burst data from the terminal.

An example controller for use in a push to talk or conferencing type service, comprises means for monitoring, in response to the controller deciding to grant a talk request received from a terminal, the remaining allowed talk time using an allowed talk timer, and means for starting the allowed talk timer at the controller in response to receipt of talk burst data from the terminal. According to a seventh aspect there is provided an operating program which, when loaded into an apparatus, causes the apparatus to become apparatus according to the third, fourth or sixth aspect.

An example operating program which, when run on an apparatus, causes the apparatus to carry out a method according to the first, second or fifth examples.

The operating program may be carried on a carrier medium. The carrier medium may be a transmission medium. The carrier medium may be a storage medium.

The term "push to talk" service is used here to identify services of a walkie-talkie nature. These are services that allow two or more users to be connected together quickly for the exchange of talk bursts. Push to Talk service differ from conventional voice calls in that these services allow only one person to talk at a given time. In order to talk, users must have control of the "floor". Control is typically achieved by one user releasing a talk button to release floor control, and another user pressing a talk button to assume floor control. It is to be understood that the term "talk burst" used in the appended claims is not intended to imply the use of any particular protocol. It is also to be understood that the scope of the claims is not limited to the transfer of talk or speech data in a talk session, and the appended claims are to be read as covering the transfer of any type of data in a data transfer session, including but not limited to speech data. It is also to be understood that the scope of the claims is intended to include conferencing systems in which a participant is granted floor control and hence the right to speak or transfer data to other participants in the conference.

An example embodiment enhances the user's experience of push-to-talk and conferencing systems by providing a mechanism to allow the terminal and in turn the user using the terminal to know the allowed talk time restriction enforced by the network controller. It enhances existing technologies in this field.

BRIEF DESCRIPTION OF THE DRAWINGS

FIG. 4, also discussed hereinbefore, shows an OMA-PoC encoding of the TBCP Talk Burst Granted message;

DETAILED DESCRIPTION

The known methods described above lack in providing the user's terminal with information concerning how long the user can talk before his right to speak is revoked. Consequently the user may be penalised by the controller without the user having sufficient information that would allow him to avoid the penalty.

The concept underlying an example embodiment is that, should the controller grant the user the right to speak, it also sends information to the terminal relating to the talk time that the user is allowed before the right to speak will be revoked by the controller.

The terminal can use this information to inform the user about the allowed talk time. This information can be provided to the user in various ways and forms, where audio and visual indications are the most common. Based on the information received from the controller, the terminal can e.g. run a decrementing timer displaying remaining talk time and generating audible or visual signals when the remaining time crosses a threshold. The exact methods the terminal uses to provide this information to the user are not important.

Based on the allowed talk time information received from the controller, the terminal can determine the time when it needs to send a release message to the controller in order to release the right to speak before the controller will revoke the right and thus to avoid the possible penalty associated with the revoke.

A general method is provided in which the controller includes the allowed talk time information in the message granting the right to speak to the user, and also disclosed is a new method for the controller to start monitoring the allowed talk time only when it starts to receive the user's speech.

Figure 1:
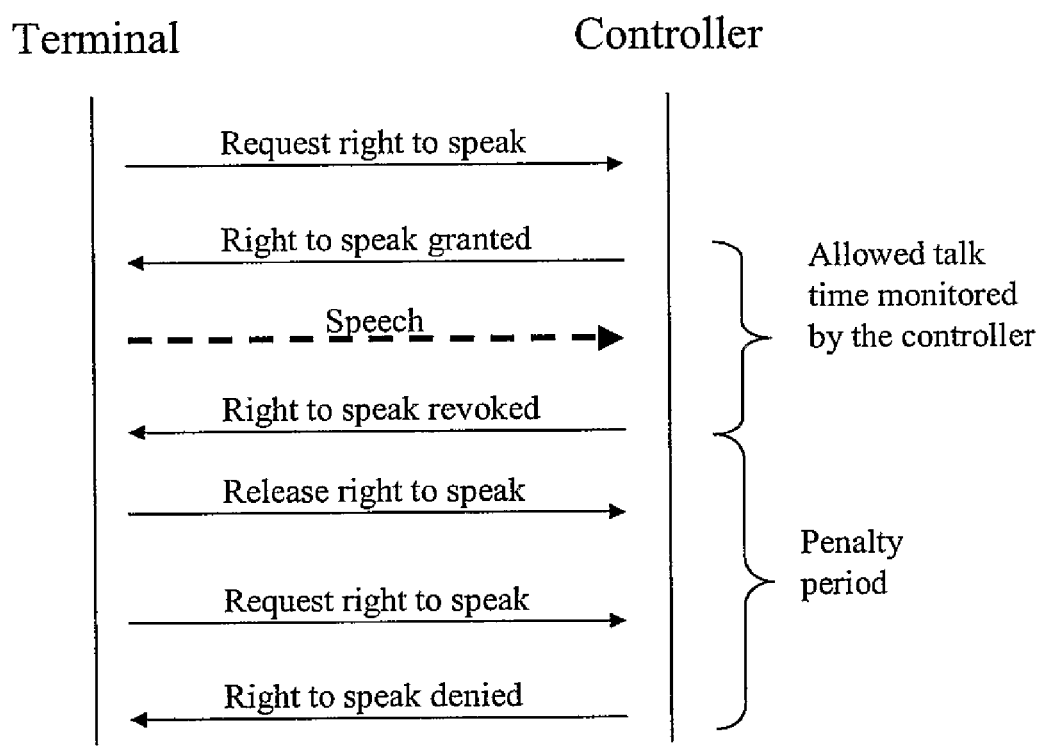
FIG. 1, discussed hereinbefore, illustrates the typical operation of a push to talk system.
Figure 2:
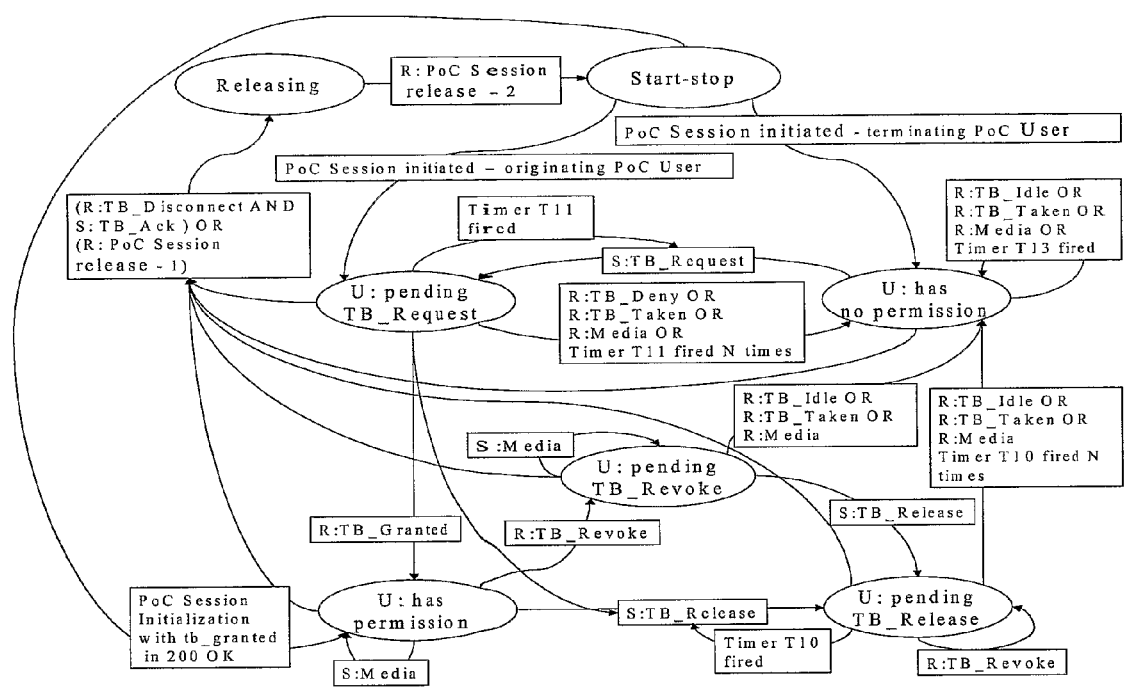
FIG. 2, also discussed hereinbefore, shows an OMA PoC Client state transition diagram for basic operation.
Figure 3:
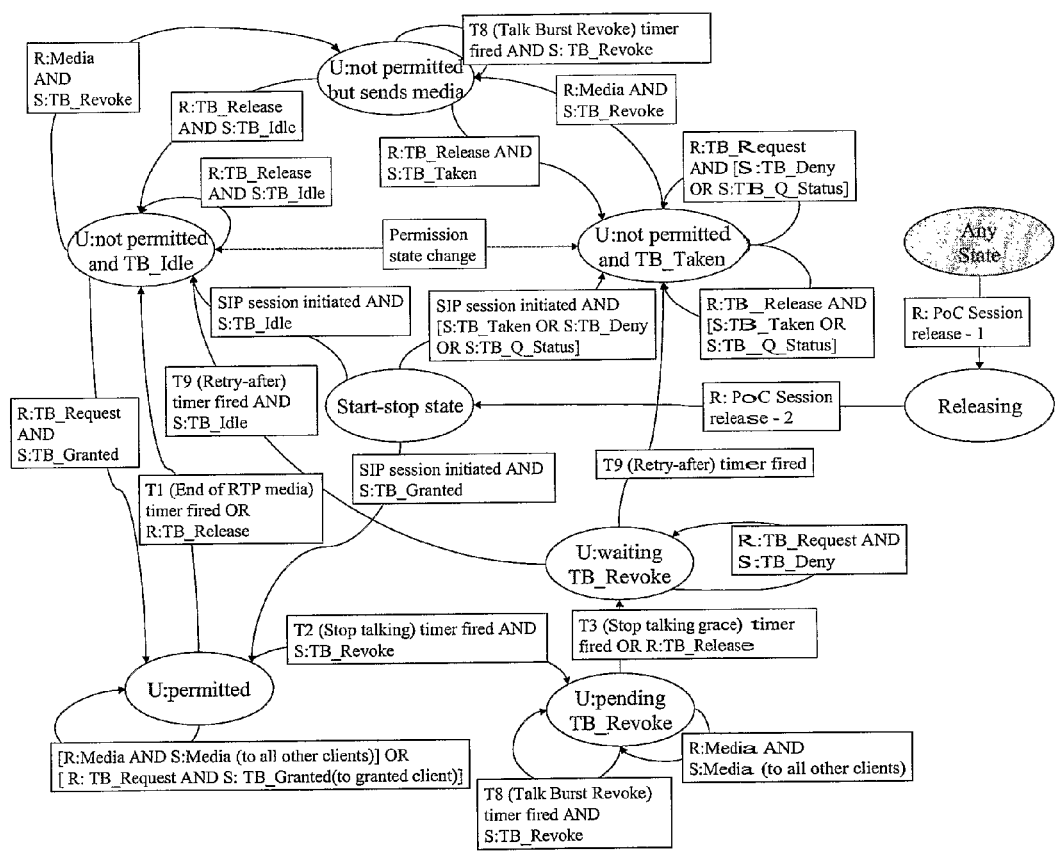
FIG. 3, also discussed hereinbefore, shows an OMA PoC Server state transition diagram for normal Talk Burst operation to the PoC Client.
Figure 5:
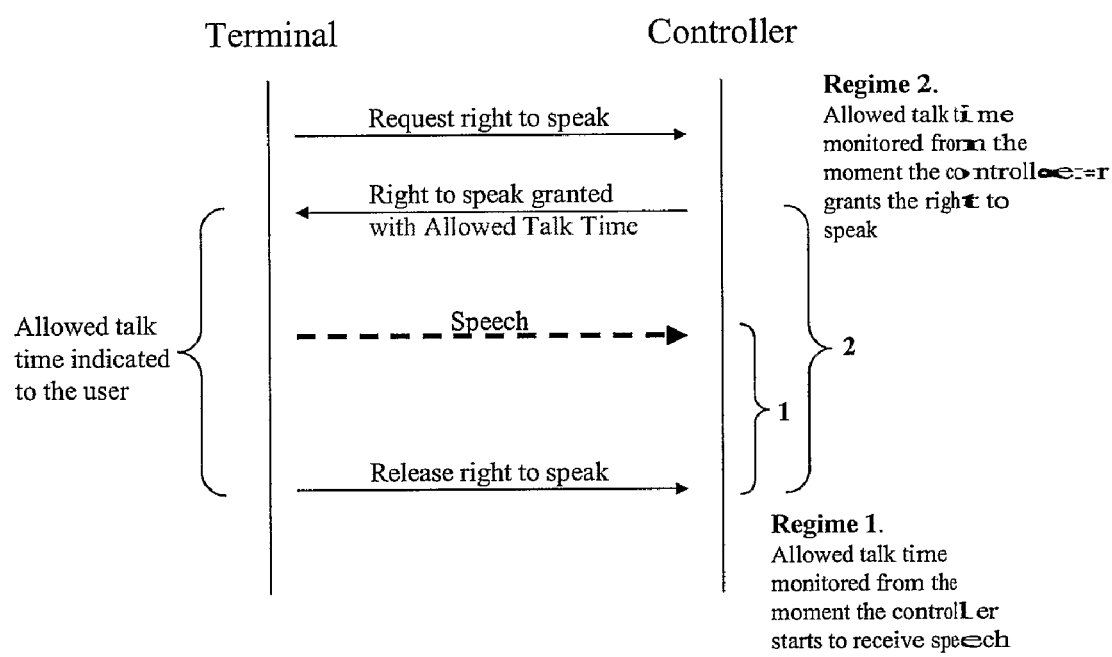
FIG. 5 illustrates two regimes for use in an embodiment.

There are two main regimes by which the controller can express the allowed talk time information to the terminal, and example embodiments will be described with reference to these two broad regimes. These two regimes are illustrated in FIG. 5, and described in more detail below. It will be appreciated that other regimes are also possible.

In a first regime, the controller applies the allowed talk time when it starts to receive speech. This has not been previously proposed. This regime is described below in more detail in connection with the first and second embodiments, which involve the sending of a message from the controller to the terminal indicating the total allowed talk time. The first and second embodiments are equally applicable for reliable and unreliable transport of the control messages.

In a second regime, the controller applies the allowed talk time when it grants the right to speak. This basic idea has been previously proposed, but the technique is implemented differently, as will be described below in connection with the third to eighth embodiments.

Within the second regime, there are three main methods described herein by which the controller can indicate the allowed talk time to the terminal. Other methods are also possible.

A first method of the second regime (referred to below as Type A) involves the sending of a message from the controller to the terminal indicating the total allowed talk time, as described in the third and fourth embodiments below. The third and fourth embodiments are equally applicable for reliable and unreliable transport of the control messages.

A second method of the second regime (referred to below as Type B) involves the sending of a message from the controller to the terminal indicating the current allowed talk time, as described in the fifth and sixth embodiments below. The fifth and sixth embodiments are particularly useful when unreliable transport is used for the control signalling between the terminal and the controller where a message re-transmission mechanism is used.

A third method of the second regime (referred to below as Type C) involves the sending of a message from the controller to the terminal indicating a timestamp of when the right to speak will expire, as described in the seventh and eighth embodiments below. The seventh and eighth embodiments are particularly useful when the terminal and controller have synchronised time, and are equally applicable for reliable and unreliable transport of the control messages. The details of the time synchronisation between the terminal and the controller are not important to the operation of the technology described in this application, but would be known to the person skilled in the art.

Specific embodiments will be described further below starting from FIG. 17. Before that, there will first be described in more detail, with reference to FIGS. 8 to 16, the concepts underlying the above-described methods and regimes.

Figure 8:
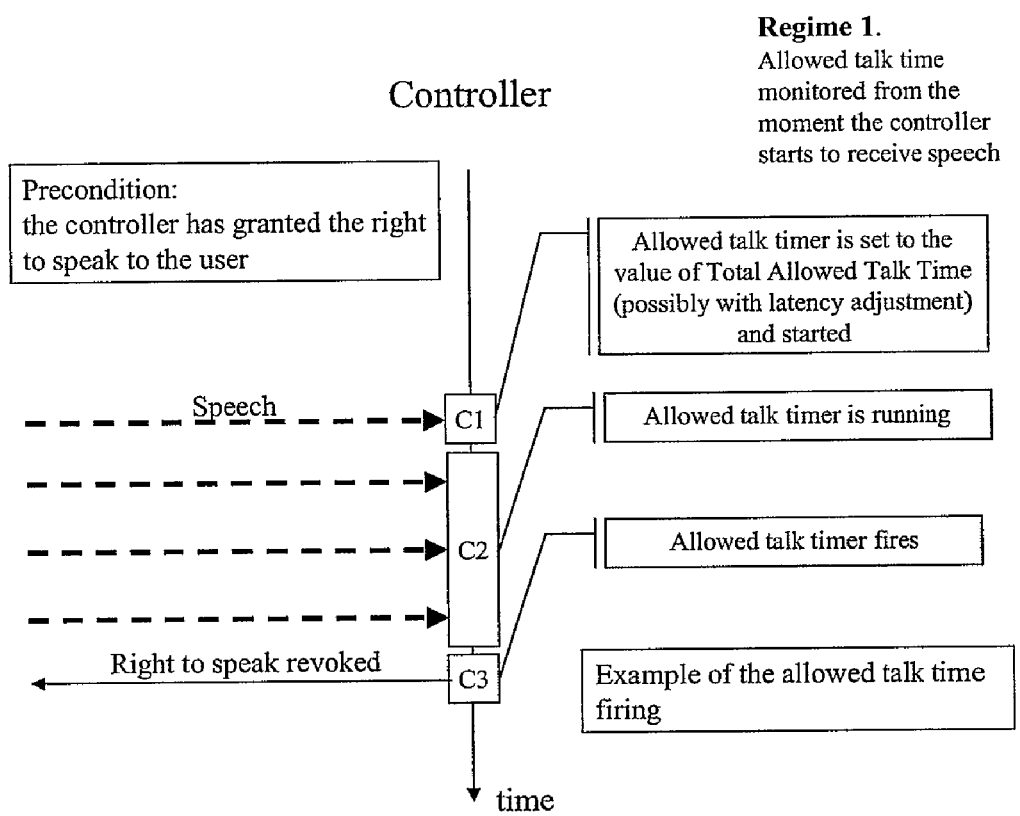
FIGS. 8 and 9 illustrate in more detail a first regime according to an embodiment.
Figure 9:
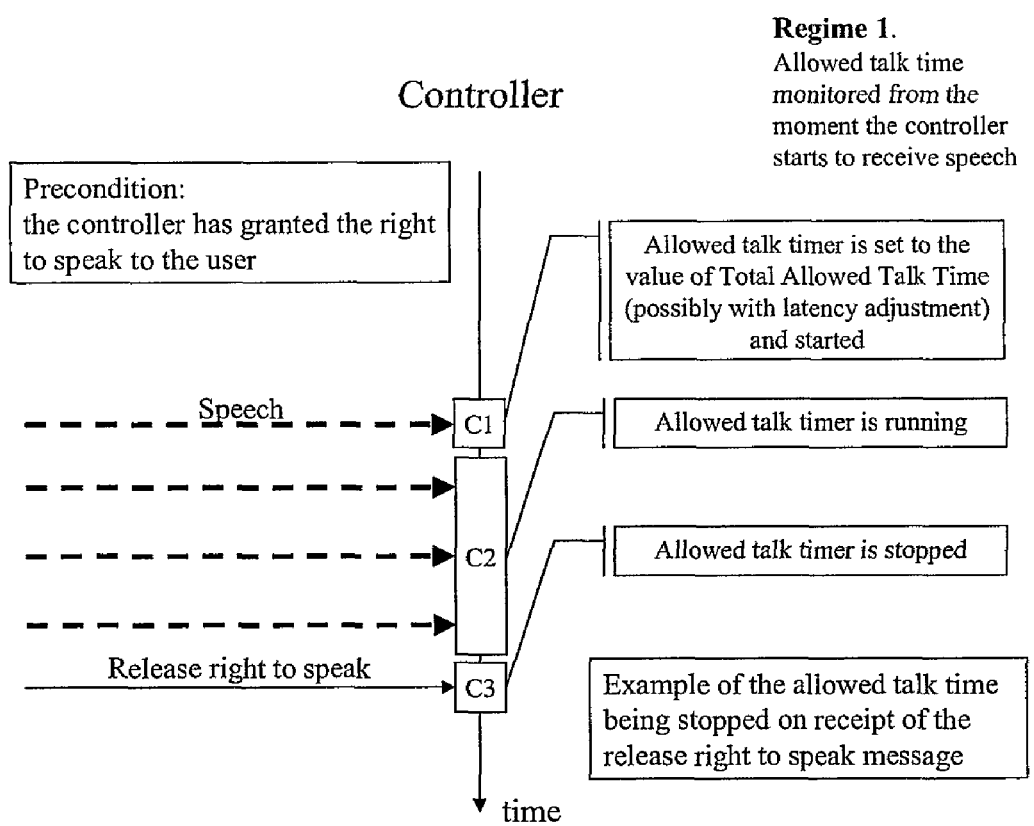

The basic principle of operation of a controller in the first regime is depicted in FIGS. 8 and 9. Specific embodiments will be described further below.

With reference to FIGS. 8 and 9, the basic principle of the operation of a controller in the first regime is as follows, with a precondition being that, at the time the controller starts to receive speech from the user, the user has the right to speak in the controller.

1. C1 of FIGS. 8 and 9

When the controller starts to receive speech from the user who is granted the right to speak, the controller sets the allowed talk timer to the value of the Total Allowed Talk Time possibly with latency adjustment (described further below), and starts the allowed talk timer.

2. C2 of FIGS. 8 and 9

While the timer is running and the speech is received from the user (whose right to speak has not otherwise been revoked in the meantime for other reasons) the controller forwards the received speech to other participants in the communication.

3. C3 of FIGS. 8 and 9

In case the allowed talk timer fires (FIG. 8), the controller typically revokes the user's right to speak and typically sends a revoke right to speak to the user.

In case the controller receives from the user who is granted the right to speak the release right to speak message (FIG. 9), the controller stops the allowed talk timer.

Figure 10:
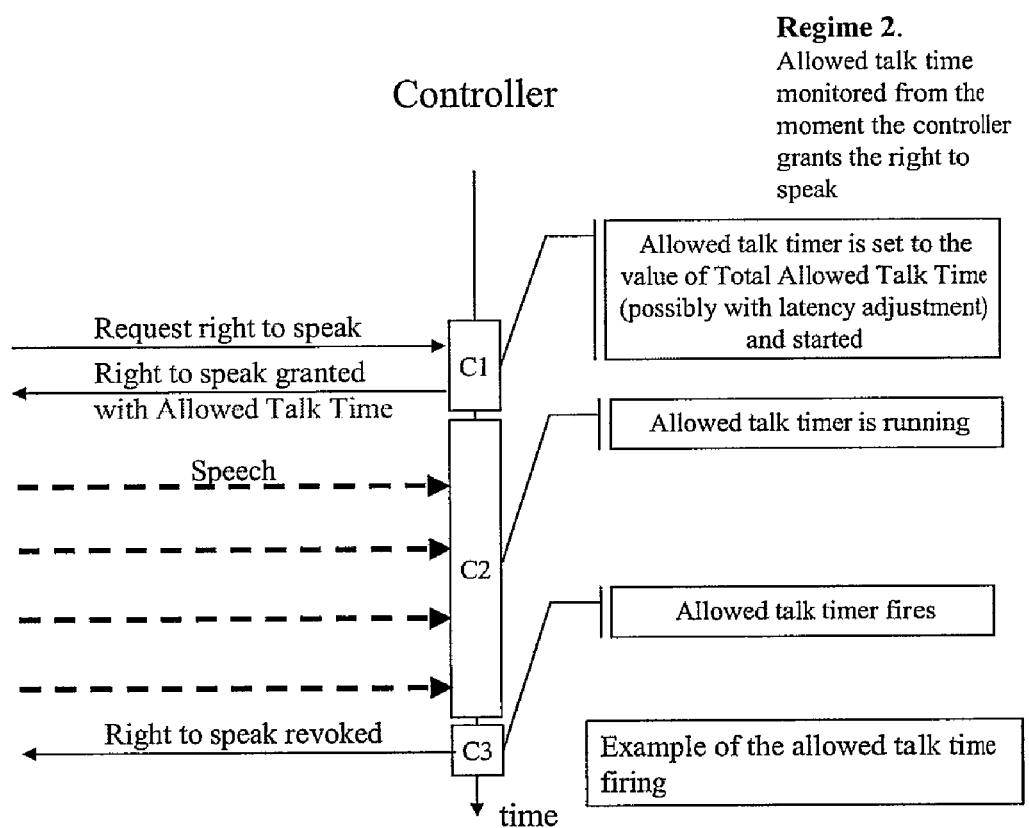
FIGS. 10 and 11 illustrate in more detail a second regime according to an embodiment.
Figure 11:
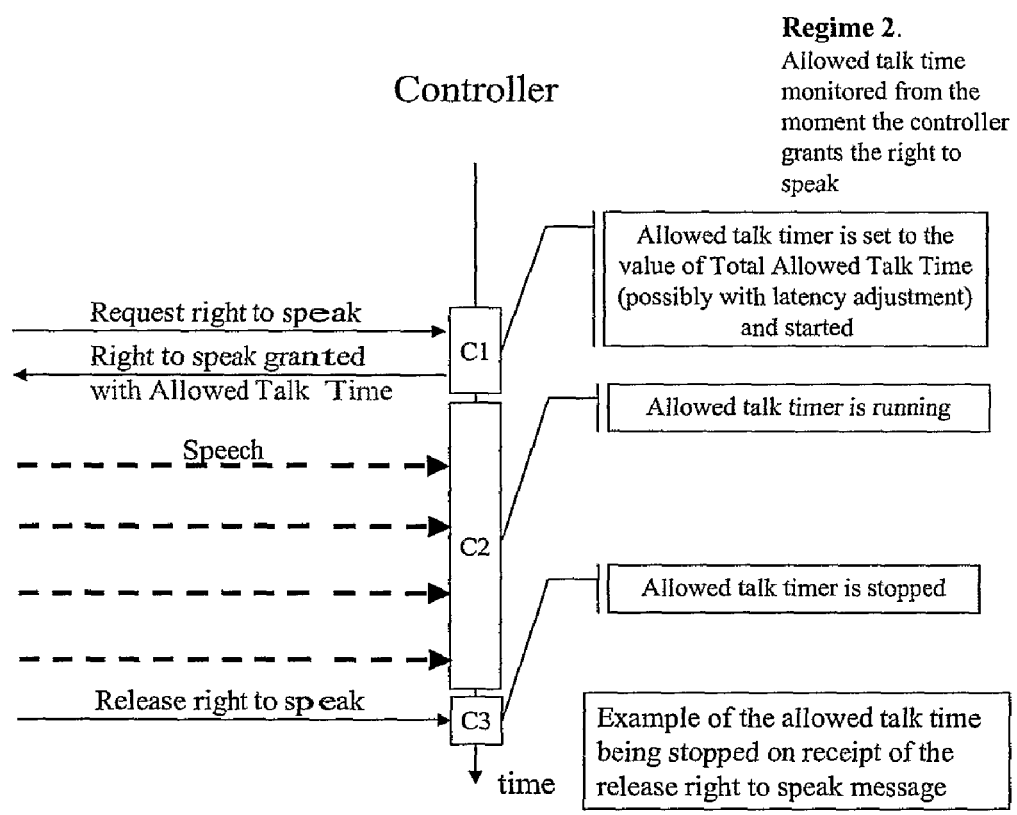

The basic principle of operation of a controller in the second regime is depicted in FIGS. 10 and 11.

With reference to FIGS. 10 and 11, the basic principle of the operation of a controller in the second regime is as follows.

1. C1 of FIGS. 10 and 11

When the controller receives a request for the right to speak from a user who is not granted such right, and if the controller determines that such right can be granted to the user, the controller grants the right to speak to the user and responds by sending the right to speak granted message to the user. The controller sets the allowed talk timer to the value of the Total Allowed Talk Time possibly with latency adjustment (described further), and starts the allowed talk timer.

2. C2 of FIGS. 10 and 11

While the timer is running and the speech is received from the user (whose right to speak has not otherwise been revoked in the meantime for other reasons) the controller forwards the received speech to other participants in the communication.

3. C3 of FIGS. 10 and 11

In case the allowed talk timer fires (FIG. 10), the controller typically revokes the user's right to speak and typically sends a revoke right to speak to the user.

In case the controller receives from the user who is granted the right to speak the release right to speak message (FIG. 11), the controller stops the allowed talk timer.

Figure 12:
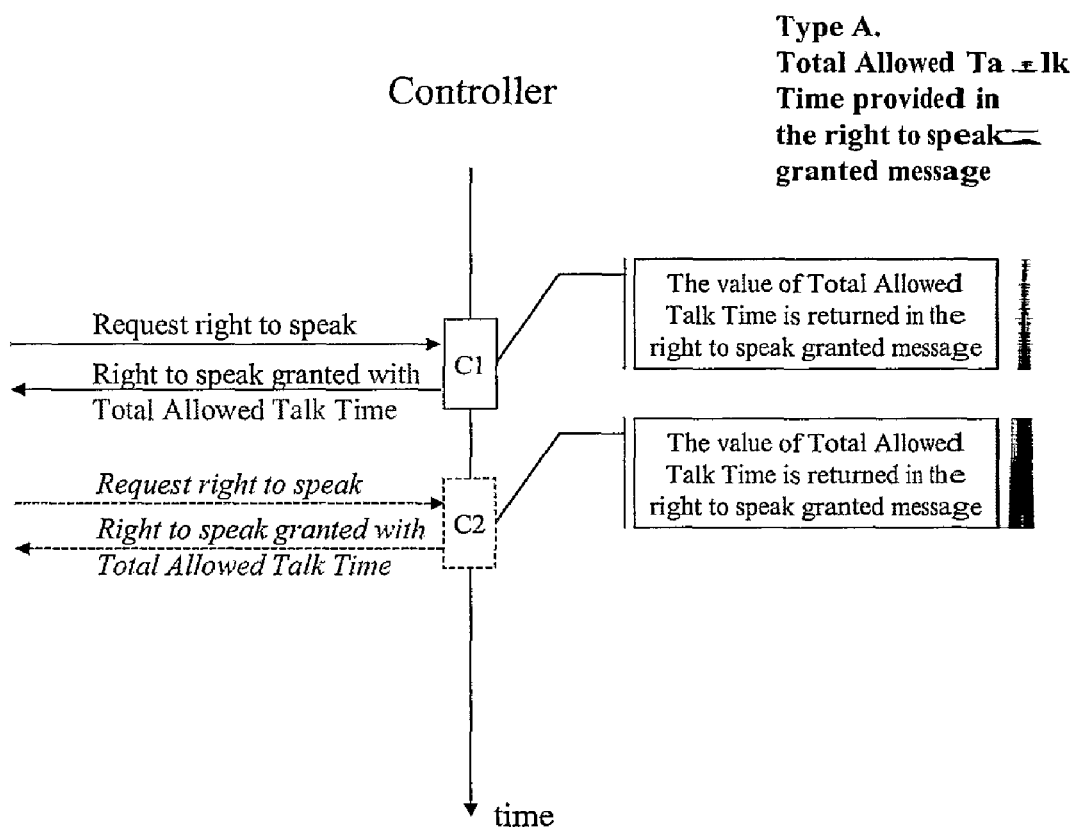
FIGS. 12 to 14 illustrate three different method types A to C respectively for providing an allowed talk time indication to the terminal in an embodiment.

The basic principle of operation of a controller in relation to the type A (Total Allowed Talk Time) of the allowed talk time information provided by the controller is depicted in FIG. 12. The basic operation of a controller in type A is as follows.

1. C1 of FIG. 12

When the controller receives a request for the right to speak from a user who is not granted such right, and if the controller determines that such right can be granted to the user, the controller grants the right to speak to the user and responds by sending the right to speak granted message to the user. In the granted message the controller includes the value of the Total Allowed Talk Time.

2. C2 of FIG. 12

If the controller receives a request for the right to speak from a user who is already granted such right, the controller responds by sending the right to speak granted message to the user. In the granted message the controller includes the value of the Total Allowed Talk Time, which is the same value as the value returned in response to the initial request in C1.

Note that the repeated request could arrive at the controller for a number of reasons. It could be a result of unreliable transport, a re-transmission mechanism, other protocol reason or other erroneous occurrence.

Figure 13:
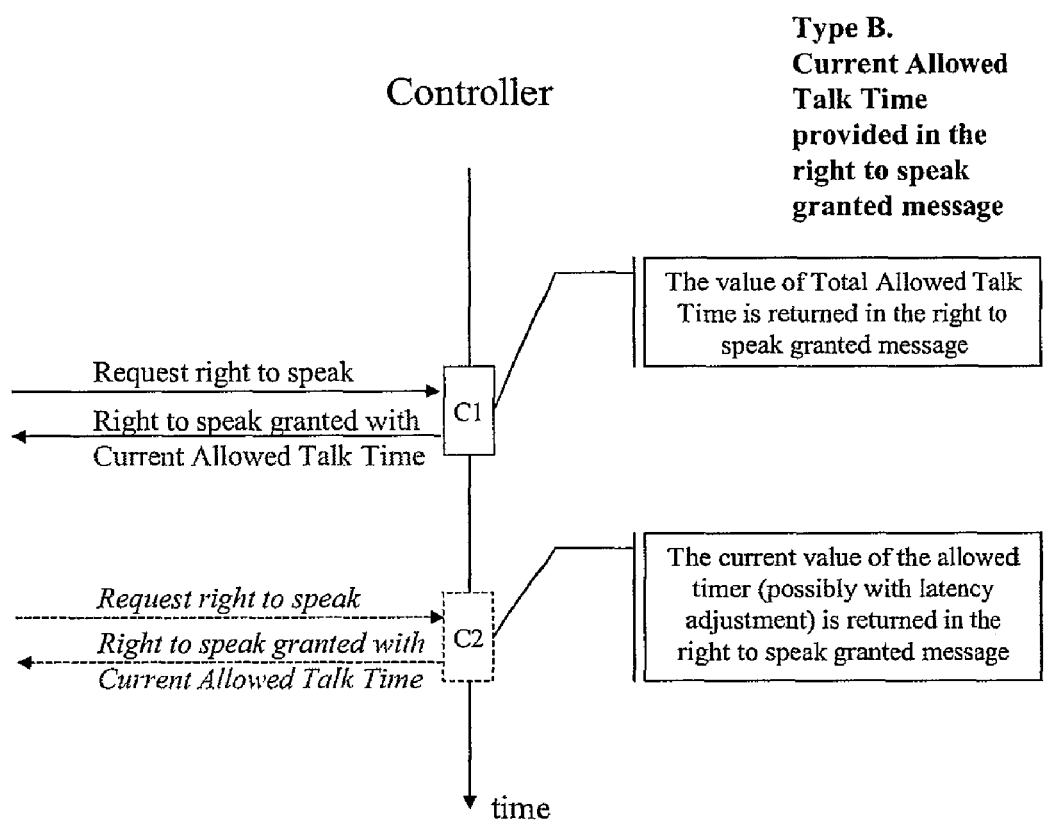

The basic principle of operation of a controller in relation to the type B (Current Allowed Talk Time) of the allowed talk time information provided by the controller is depicted in FIG. 13. The basic operation of a controller in type B (Current Allowed Talk Time) is as follows.

1. C1 of FIG. 13

When the controller receives a request for the right to speak from a user who is not granted such right, and if the controller determines that such right can be granted to the user, the controller grants the right to speak to the user and responds by sending the right to speak granted message to the user. In the granted message the controller includes the value of the Total Allowed Talk Time.

2. C2 of FIG. 13

If the controller receives a request for the right to speak from a user who is already granted such right, the controller responds by sending the right to speak granted message to the user. In the granted message the controller includes the value of the Current Allowed Talk Time, which is the current value of the allowed talk timer possibly with latency adjustment (described further). If the allowed timer is not yet started (possible in regime 1) the value of the Current Allowed Talk Time will be equal to the Total Allowed Talk Time. Otherwise the current value of the allowed talk timer will be less than the Total Allowed Talk Time at this point as it has already decremented since it started.

Note that the repeated request could arrive at the controller for a number of reasons. It could be a result of unreliable transport, a re-transmission mechanism, other protocol reason or other erroneous occurrence.

Figure 14:
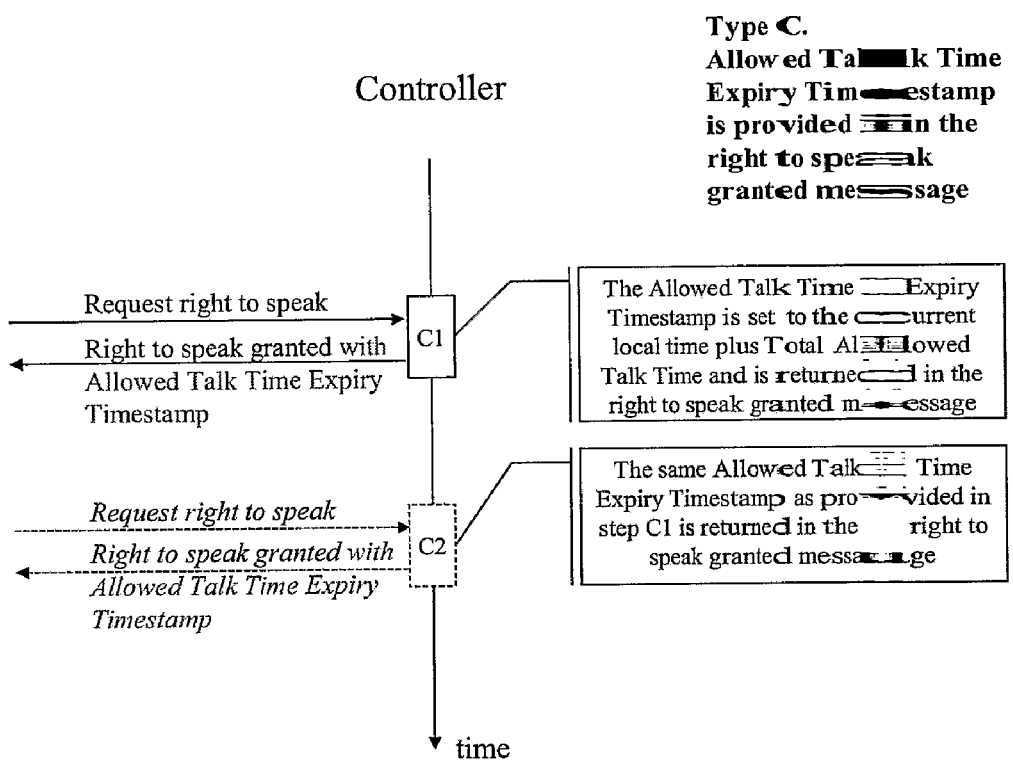

The basic principle of operation of a controller in relation to the type C (Allowed Talk Time Expiry Timestamp) of the allowed talk time information provided by the controller is depicted in FIG. 14. The basic principle of operation of a controller in type C (Allowed Talk Time Expiry Timestamp) is as follows.

1. C1 of FIG. 14

When the controller receives a request for the right to speak from a user who is not granted such right, and if the controller determines that such right can be granted to the user, the controller grants the right to speak to the user and responds by sending the right to speak granted message to the user. In the granted message the controller includes the value of the Allowed Talk Time Expiry Timestamp. The controller calculates the Allowed Talk Time Expiry Timestamp by adding the Total Allowed Talk Time to the current local time at the controller.

2. C2 of FIG. 14

If the controller receives a request for the right to speak from a user who is already granted such right, the controller responds by sending the right to speak granted message to the user. In the granted message the controller includes the value of the Allowed Talk Time Expiry Timestamp, which is the same value as that returned in C1.

Note that the repeated request could arrive at the controller for a number of reasons. It could be a result of unreliable transport, a re-transmission mechanism, other protocol reason or other erroneous occurrence.

Figure 15:
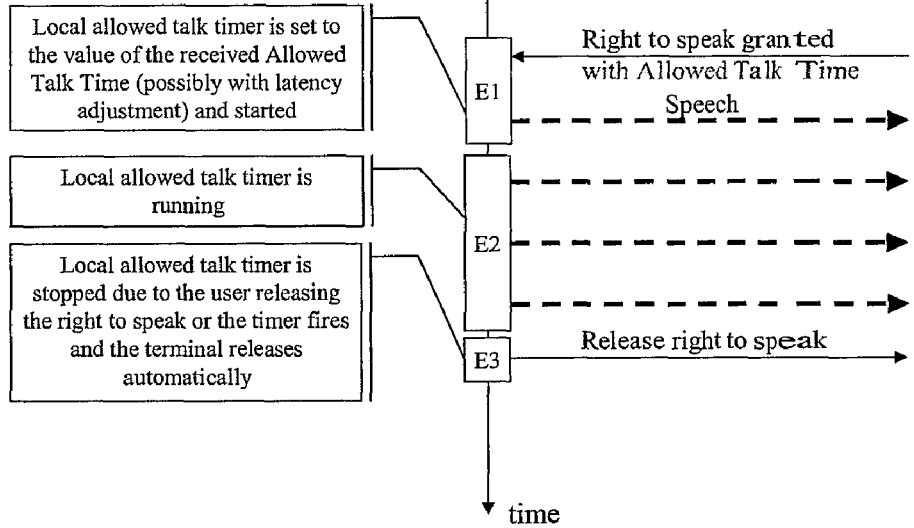
FIG. 15 illustrates schematically a possible way of handling the allowed talk time indication at the terminal in a method performed for method types A and B.

The basic principle of operation of a terminal is substantially the same in relation to the type A (Total Allowed Talk Time) and type B (Current Allowed Talk Time) of the allowed talk time information provided by the controller, and is depicted in FIG. 15. The basic operation of the terminal is substantially independent of the regime used by the controller. (However, if the terminal makes latency adjustment it may need to know the regime under which the controller is operating.)

With reference to the FIG. 15 the basic principle of the operation of a terminal in regard to the local allowed time handling for types A (Total Allowed Talk Time) and B (Current Allowed Talk Time) is as follows, with a precondition that: (a) the user does not have the right to speak and has requested such a right; (b) the terminal has sent the request right to speak message to the controller and is awaiting the response; and (c) the terminal may have re-sent the request to the controller (if this is part of the normal operation of the terminal).

1. E1 of FIG. 15

When the terminal receives the message that the right to speak is granted it typically provides an indication to the user and makes ready to receive speech from the user and to send the speech to the controller. The terminal starts to send speech to the controller.

When the terminal receives the right to speak granted message with the new allowed talk time information, the terminal sets the new local allowed talk timer to the value received in the granted message possibly with latency adjustment (described further).

2. E2 of FIG. 15

While the local allowed timer is running and the user continues to keep his right to speak, the terminal continues to sends user's speech it to the controller.

The terminal can use the local allowed timer to inform the user of the remaining allowed talk time.

If the terminal receives another right to speak granted message while it the user already has the right to speak, the terminal ignores any allowed talk time information in the granted message and does not change the value of the running local allowed timer.

Note that the repeated response could arrive at the terminal for a number of reasons. It could be a result of unreliable transport, a re-transmission mechanism, other protocol reason or other erroneous occurrence.

3. E3 of FIG. 15

In case the user releases the right to speak, the terminal stops the local allowed talk timer, stops sending speech, and sends the release right to speak message to the controller.

In case the local allowed talk timer fires the terminal would typically indicate this event to the user. Possibly based on user input or pre-configured preference or automatically the terminal may then stop receiving user's speech and sending it to the controller in which case it sends to the controller the message to release the right to speak.

Figure 16:
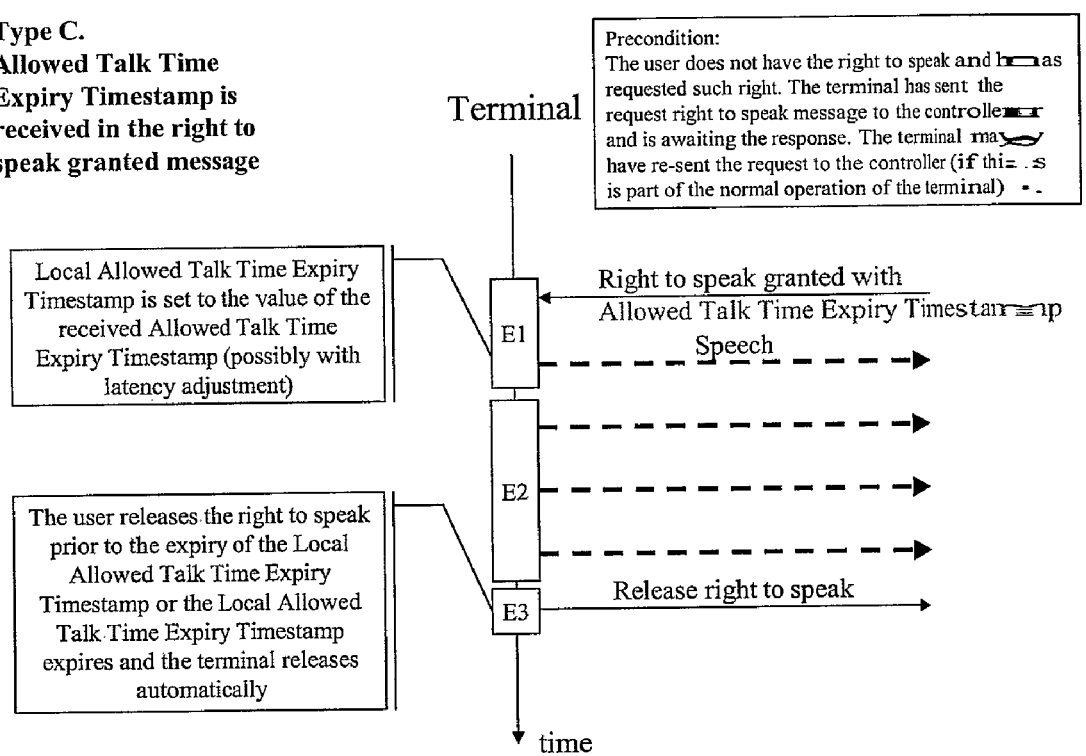
FIG. 16 illustrates schematically a possible way of handling the allowed talk time indication at the terminal in a method performed for method type C.
Figure 17:
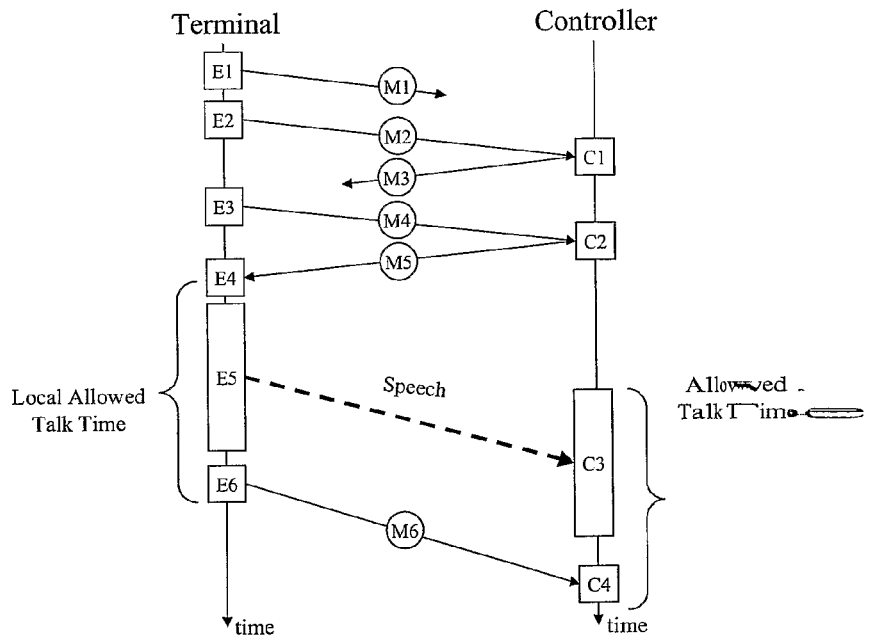
FIG. 17 illustrates a first embodiment.

The basic principle of operation of a terminal in relation to the type C (Allowed Talk Time Expiry Timestamp) of the allowed talk time information provided by the controller is depicted FIG. 16. The basic operation of the terminal is substantially independent of the regime of the controller.

With reference to FIG. 16, the basic operation of the terminal in regard to the local allowed time handling for type C (Allowed Talk Time Expiry Timestamp) is as follows, with the precondition that: (a) the user does not have the right to speak and has requested such right; (b) the terminal has sent the request right to speak message to the controller and is awaiting the response; and (c) the terminal may have re-sent the request to the controller (if this is part of the normal operation of the terminal).

1. E1 of FIG. 16

When the terminal receives the message that the right to speak is granted it typically provides an indication to the user and makes ready to receive speech from the user and to send the speech to the controller. The terminal starts to send speech to the controller.

When the terminal receives the right to speak granted message with the new Allowed Talk Time Expiry Timestamp, the terminal sets the new Local Allowed Talk Time Expiry Timestamp to the value received in the granted message possibly with latency adjustment (described further) and activates the timestamp.

2. E2 of FIG. 16

While the local time at the terminal has not reached the Local Allowed Talk Time Expiry Timestamp and the user continues to keep his right to speak, the terminal continues to sends user's speech it to the controller.

The terminal can use the Local Allowed Talk Time Expiry Timestamp to inform the user of the remaining allowed talk time.

If the terminal receives another right to speak granted message while it the user already has the right to speak, the terminal ignores any allowed talk time information in the granted message and does not change the value of the Local Allowed Talk Time Expiry Timestamp.

Note that the repeated response could arrive at the terminal for a number of reasons. It could be a result of unreliable transport, a re-transmission mechanism, other protocol reason or other erroneous occurrence.

3. E3 of FIG. 16

In case the user releases the right to speak, the terminal deactivates the Local Allowed Talk Time Expiry Timestamp, stops sending speech, and sends the release right to speak message to the controller.

In case the local time at the terminal reaches the Local Allowed Talk Time Expiry Timestamp the terminal would typically indicate this event to the user. Possibly based on user input or pre-configured preference or automatically the terminal may then stop receiving user's speech and sending it to the controller in which case it sends to the controller the message to release the right to speak.

Note that the actual implementation of the timers in the terminal and the controller in terms of how they are started, run, and stopped is not a focus of this description. Similarly the actual implementation of the timestamps in the terminal and the controller in terms of how they are activated, run, and deactivated is not a focus of this description.

The control messages and speech are typically subject to variable delay when transported between the terminal and the controller. The delay characteristics of the system may be different in the uplink direction (from the terminal to the controller) and in the downlink direction (from the controller to the terminal). Some intelligent terminals and controllers currently have mechanisms to estimate the uplink and downlink latencies based on the knowledge of the type of transport used, available bandwidth, type of link technology, etc. Others do not have this ability. Some methods are described below, following the description of the eighth embodiment, of estimating the roundtrip delay based on the time measurement of the control messages, taking into account cases where reliable and unreliable transport is used.

Embodiments can be further categorised and distinguished between those in which the controller makes latency adjustments, and those in which the terminal makes latency adjustments. In the first, third, fifth and seventh embodiments the terminal makes latency adjustments, while in the second, fourth, sixth and eighth embodiments the controller makes latency adjustments.

The controller may monitor the allowed talk time by running a timer, called here the allowed talk timer. The allowed talk timer may be started with a certain value either when the speech starts to be received (first regime 1) or when the right to speak is granted (second regime). The allowed talk timer may be set in the controller to a value dependent on whether the controller makes latency adjustments. If it does (method A), the controller may set the allowed talk timer to the sum of the total allowed talk time and the latency adjustments time. If it does not, the controller may set the allowed talk timer to the total allowed talk time.

The terminal may also monitor the allowed talk time by running a timer, called here the local allowed talk timer. The local allowed timer may be started with a certain value when the terminal receives the right to speak granted message. The local allowed talk timer may be set in the terminal to a value dependent on whether the terminal makes latency adjustments. If it does not, the terminal may set the local allowed talk timer to the value of the allowed talk time received from the controller in the right to speak granted message. If it does (method B), the terminal may set the local allowed talk timer to the value of the allowed talk time received from the controller in the right to speak granted message subtracted with the latency adjustment.

Figure 6:
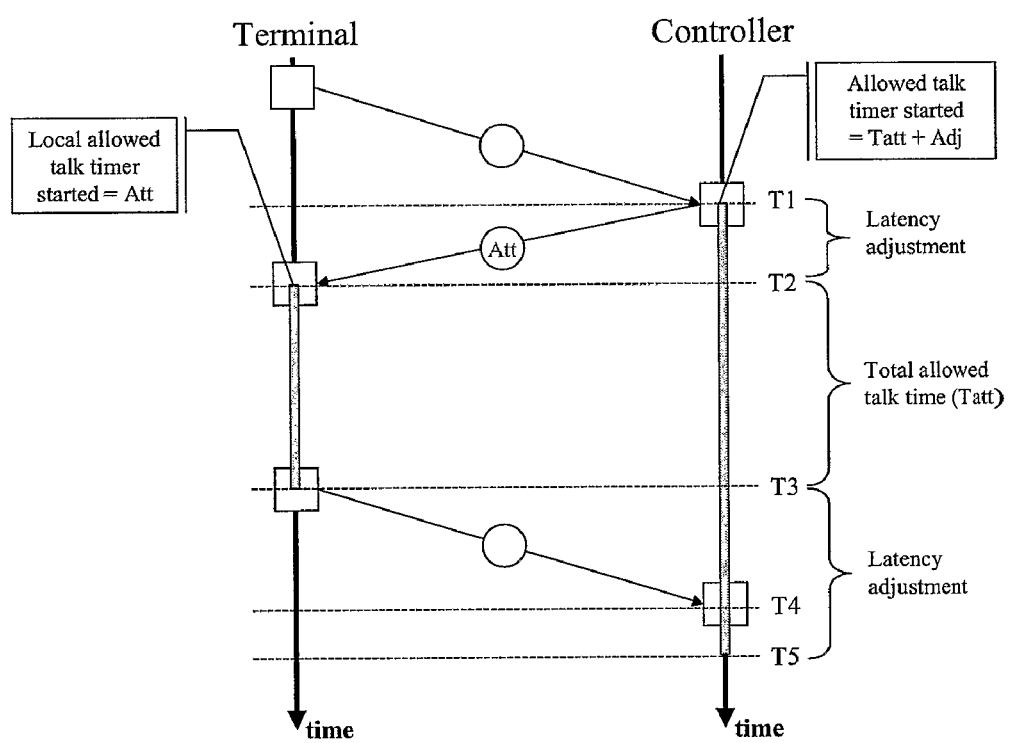
FIG. 6 illustrates an example where the controller makes latency adjustment.
Figure 7:
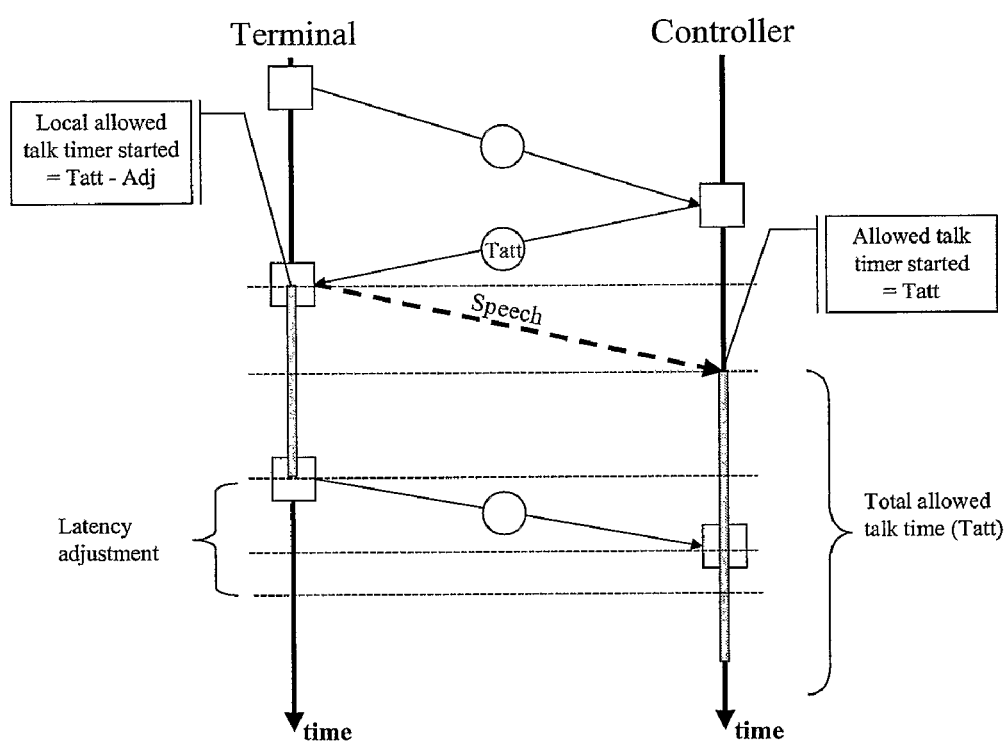
FIG. 7 illustrates an example where the terminal makes latency adjustment.

FIG. 6 shows the principle of method A where the controller makes latency adjustment (as an example in the case of the second regime). FIG. 7 shows the principle of method B where the terminal makes latency adjustment (as an example in the case of the first regime).

The alternative methods for making the latency adjustments in the terminal and the controller can be considered to relate to a further aspect.

The methods described below for estimating a roundtrip delay for the control messages, for example using time measurement of the control messages, can be considered to relate to a further aspect.

It will be appreciated that the same methods and mechanisms can be used even in situations where real-time media other than speech are used in the communication, and the following description should be read as covering not only speech information but also any other type of real-time media.

A first embodiment will now be described with reference to FIG. 17. The sequence of events illustrated in FIG. 17 is as follows, referring to parts and messages labelled in the diagram. Each part labelled with an E prefix in FIG. 17 represents means at the terminal for performing the functions described below with reference to that part. Each part labelled with a C prefix in FIG. 17 represents means at the controller for performing the functions described below with reference to that part. The message sequence illustrated in FIG. 17 shows an example of message loss; it will be appreciated that this is merely an illustration of one possible message sequence arising from message loss, and other sequences could also result from such message loss or mis-sequencing.

1. E1 of FIG. 17

When the user requests the right to speak, the terminal sends the request for the right to speak to the controller. The terminal starts a re-transmission timer for the request.

Figure 25:
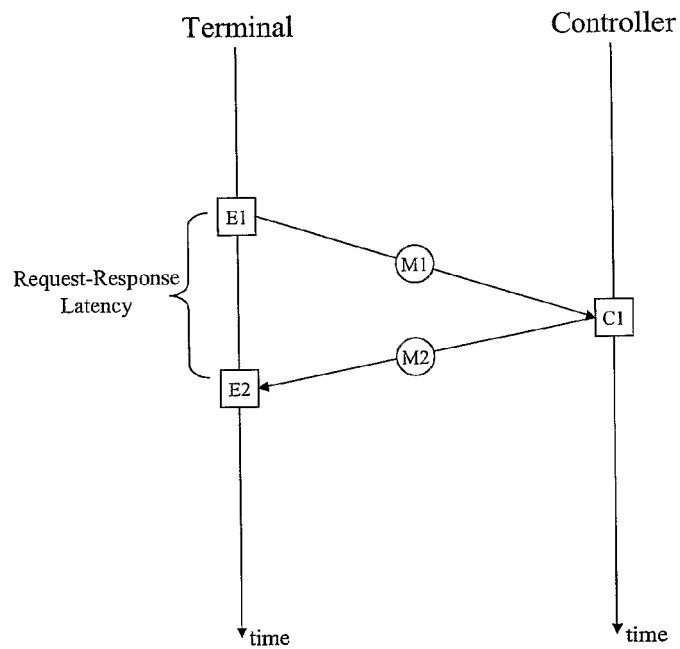
FIG. 25 illustrates a first technique for estimating latency in an embodiment.
Figure 26:
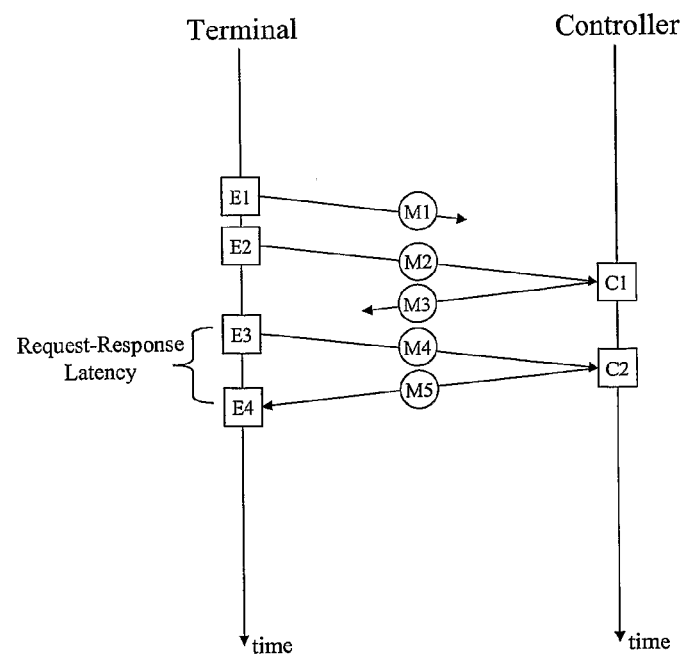
FIG. 26 illustrates a second technique for estimating latency in an embodiment.
Figure 27:
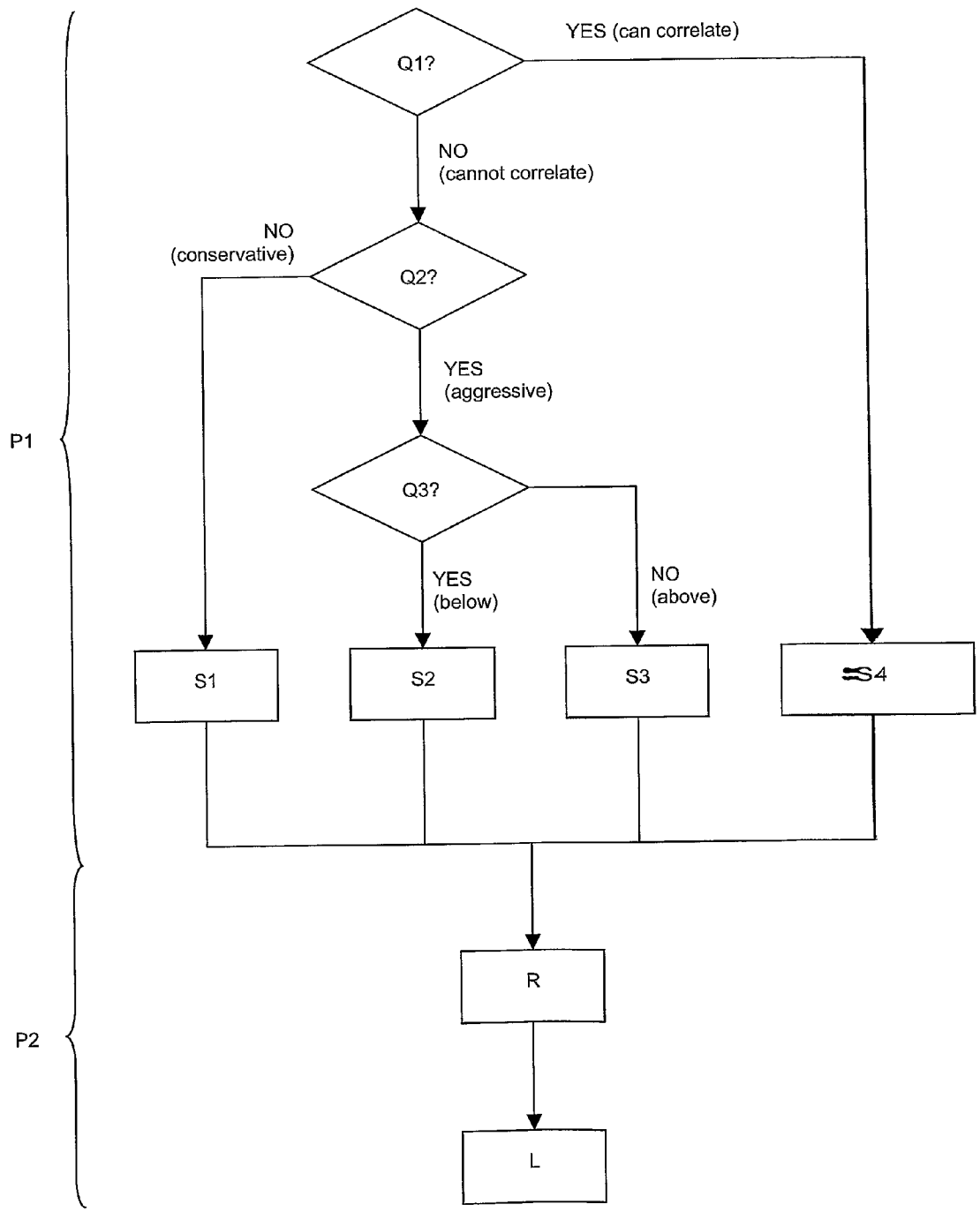
FIG. 27 illustrates in more detail part of the second technique.

Note that the terminal may use this request message to estimate the latencies as described below with reference to FIGS. 25 to 27.

2. M1 of FIG. 17

The request message is transmitted by the terminal, and in this example sequence lost on the way to the controller.

3. E2 of FIG. 17

The request re-transmission timer fires in the terminal, which triggers the terminal to re-send the request for the right to speak. The terminal re-starts the request re-transmission timer.

Note that the terminal may use this request message to estimate the latencies as described below with reference to FIGS. 25 to 27.

4. M2 of FIG. 17

The re-transmitted request message is transported successfully to the controller.

5. C1 of FIG. 17

When the controller receives the request and grants the right to speak to the user it determines the allowed talk time but does not start the timer to control the allowed talk time at this time. (Note: in previously-considered methods the controller would start the timer at this point). The controller responds to the terminal with a message that the right to speak is granted. In this message it includes the value of the total allowed talk time (Tatt). Including the total allowed talk time in the right to speak granted message is novel. It is also novel to not start the allowed talk timer at this time.

6. M3 of FIG. 17

The granted message is transmitted by the controller and in this example sequence lost on the way to the terminal. This message includes the new total allowed talk time value (Tatt).

7. E3 of FIG. 17

The request re-transmission timer fires in the terminal, which triggers the terminal to re-send the request for the right to speak. The terminal re-starts the request re-transmission timer.

Note that the terminal may use this request message to estimate the latencies as described below with reference to FIGS. 25 to 27.

8. M4 of FIG. 17

The request message is transported successfully to the controller.

9. C2 of FIG. 17

When the controller receives the re-transmitted request it is aware that it has already granted the user the right to speak. The controller responds to the terminal with a message that the right to speak is granted. In this message it includes the value of the total allowed talk time (Tatt). At this point the allowed talk timer is not yet started. Including the total allowed talk time in the right to speak granted message is novel.

Note that in the normal operation of the controller the controller could have decided to give the right to speak to another user in the connection between C1 and C2. Since this is not important to the operation, this case is not described here, but it would be understood by the person skilled in the art without further explanation.

10. M5 of FIG. 17

The granted message is transported successfully to the terminal. This message includes the new total allowed talk time value (Tatt).

11. E4 of FIG. 17

When the terminal receives the message that the right to speak is granted it typically provides an indication to the user and makes ready to receive speech from the user and to send the speech to the controller. The terminal stops the request re-transmission timer.

Note that the terminal may use this response message to estimate the latencies as described below with reference to FIGS. 25 to 27.

The terminal calculates the uplink latency adjustment (Adup) as described below after the description relating to FIG. 27. The local allowed talk timer is started with the value of (Tatt−Adup).

This handling of the local allowed talk timer is novel.

12. E5 of FIG. 17

The terminal receives user's speech and sends to the controller. The terminal runs the local allowed talk timer. Based on this timer the terminal would typically indicate to the user the remaining allowed talk time.

This handling of the local allowed talk timer is novel.

13. C3 of FIG. 17

The controller receives the user's speech and forwards it to other participants in the communication. When the controller starts to receive the speech it starts the allowed talk timer at this point with the value of the total allowed talk time (Tatt).

Starting the allowed talk timer when the speech starts to be received is novel.

14. E6 of FIG. 17

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

Note that the terminal may use this release message to estimate the latencies as described below with reference to FIGS. 25 to 27.

The above handling is novel.

15. M6 of FIG. 17

The release message is transported to the controller.

16. C4 of FIG. 17

When the controller receives the message to release the right to speak it stops the allowed talk timer. Since the release message is received prior to expiry of the allowed talk timer the controller does not apply any penalty.

Figure 18:
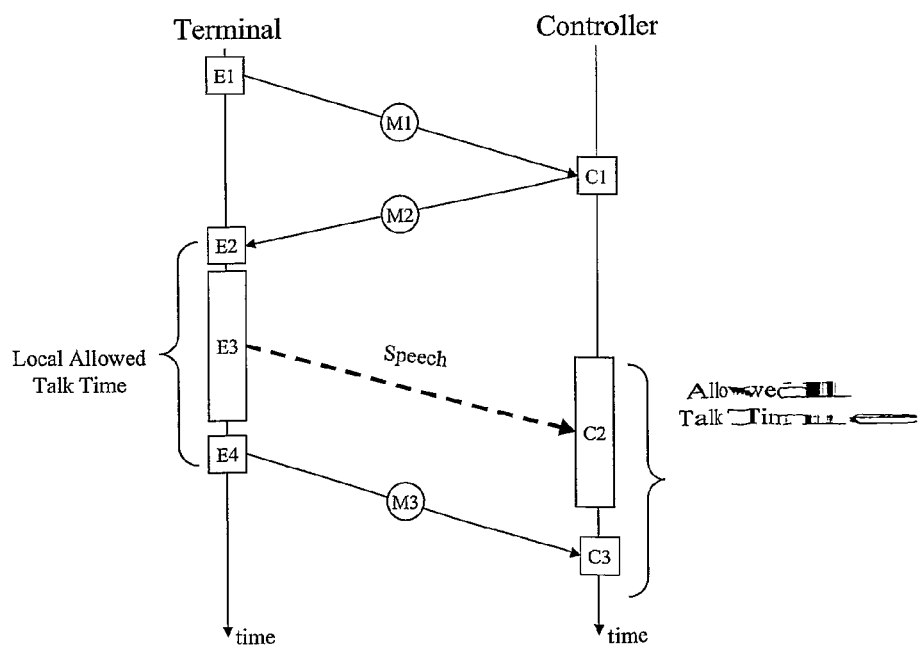
FIG. 18 illustrates a second embodiment.

A second embodiment will now be described with reference to FIG. 18. The sequence of events illustrated in FIG. 18 is as follows, referring to parts and messages labelled in the diagram. Each part labelled with an E prefix in FIG. 18 represents means at the terminal for performing the functions described below with reference to that part. Each part labelled with a C prefix in FIG. 18 represents means at the controller for performing the functions described below with reference to that part. This embodiment shows an example sequence where message repetition is not used or it does not occur.

1. E1 of FIG. 18

When the user requests the right to speak, the terminal sends the request for the right to speak to the controller.

2. M1 of FIG. 18

The request message is transported to the controller.

3. C1 of FIG. 18

When the controller receives the request and grants the right to speak to the user it determines the allowed talk time but does not start the timer to control the allowed talk time at this time. (Note: in previously-considered methods the controller would start the timer at this point). The controller responds to the terminal with a message that the right to speak is granted. In this message it includes the value of the total allowed talk time (Tatt). Including the total allowed talk time in the right to speak granted message is novel. It is also novel to not start the allowed talk timer at this time.

4. M2 of FIG. 18

The granted message is transported to the terminal. This message includes the new total allowed talk time value (Tatt).

5. E2 of FIG. 18

When the terminal receives the message that the right to speak is granted it typically provides an indication to the user and makes ready to receive speech from the user and to send the speech to the controller. The terminal starts a local allowed talk timer (Latt) at that time. The value of that timer is equal to the value of the total allowed talk time received in M2.

This handling of the local allowed talk timer is novel.

6. E3 of FIG. 18

The terminal receives user's speech and sends the speech to the controller. The terminal runs the local allowed talk timer. Based on this timer the terminal would typically indicate to the user the remaining allowed talk time.

7. C2 of FIG. 18

The controller receives the user's speech and forwards it to other participants in the communication. When the controller starts to receive the speech it starts the allowed talk timer at this point with the value of the total allowed talk time adjusted upwards to accommodate the latencies. The controller calculates the uplink latency adjustment (Adup) as described as described below following the description relating to FIG. 27. The allowed talk timer is set to (Tatt+Adup).

Starting the allowed talk timer when the speech starts, to be received and adjusting the talk timer is novel.

8. E4 of FIG. 18

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

The above handling is novel.

9. M3 of FIG. 18

The release message is transported to the controller.

10. C3 of FIG. 18

When the controller receives the message to release the right to speak it stops the allowed talk timer. Since the release message is received prior to expiry of the allowed talk timer the controller does not apply any penalty.

Figure 19:
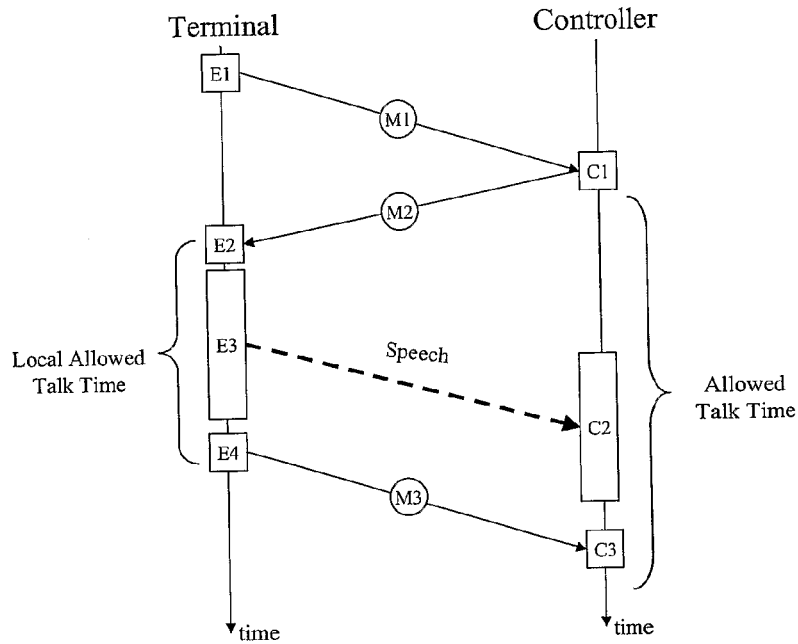
FIG. 19 illustrates a third embodiment.

A third embodiment will now be described with reference to FIG. 19. The sequence of events illustrated in FIG. 19 is as follows, referring to parts and messages labelled in the diagram. Each part labelled with an E prefix in FIG. 19 represents means at the terminal for performing the functions described below with reference to that part. Each part labelled with a C prefix in FIG. 19 represents means at the controller for performing the functions described below with reference to that part. This embodiment shows an example sequence where message repetition is not used or it does not occur.

1. E1 of FIG. 19

When the user requests the right to speak, the terminal sends the request for the right to speak to the controller.

Note that the terminal may use this request message to estimate the latencies as described below with reference to FIGS. 25 to 27.

2. M1 of FIG. 19

The request message is transported to the controller.

3. C1 of FIG. 19

When the controller receives the request and grants the right to speak to the user it starts the timer to control the allowed talk time. It responds to the terminal with a message that the right to speak is granted. In this message it includes the value of the total allowed talk time (Tatt), which is equal to the timer value it has started. Including the total allowed talk time in the right to speak granted message is novel.

4. M2 of FIG. 19

The granted message is transported to the terminal. This message includes the new total allowed talk time value (Tatt).

5. E2 of FIG. 19

When the terminal receives the message that the right to speak is granted it typically provides an indication to the user and makes ready to receive speech from the user and to send the speech to the controller.

Note that the terminal may use this response message to estimate the latencies as described below with reference to FIGS. 25 to 27.

The terminal starts a local allowed talk timer (Latt) at that time. The value of that timer is based on the value of the total allowed talk time received in M2 adjusted down to accommodate the message transfer latencies. In this case the terminal adjusts for the message transfer latencies by deducting the adjustment value for the aggregate downlink and uplink transfer, calculated as described below following the description relating to FIG. 27, from the total allowed talk timer as follows:

Latt=Tatt−Addown+up

This handling of the local allowed talk timer is novel.

6. E3 of FIG. 19

The terminal receives user's speech and sends to the controller. The terminal runs the local allowed talk timer. Based on this timer the terminal would typically indicate to the user the remaining allowed talk time.

7. C2 of FIG. 19

The controller receives the user's speech and forwards it to other participants in the communication. The controller runs the allowed talk timer.

8. E4 of FIG. 19

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

Note that the terminal may use this release message to estimate the latencies as described below with reference to FIGS. 25 to 27.

The above handling is novel.

9. M3 of FIG. 19

The release message is transported to the controller.

10. C3 of FIG. 19

When the controller receives the message to release the right to speak it stops the allowed talk timer. Since the release message is received prior to expiry of the allowed talk timer the controller does not apply any penalty.

Figure 20:
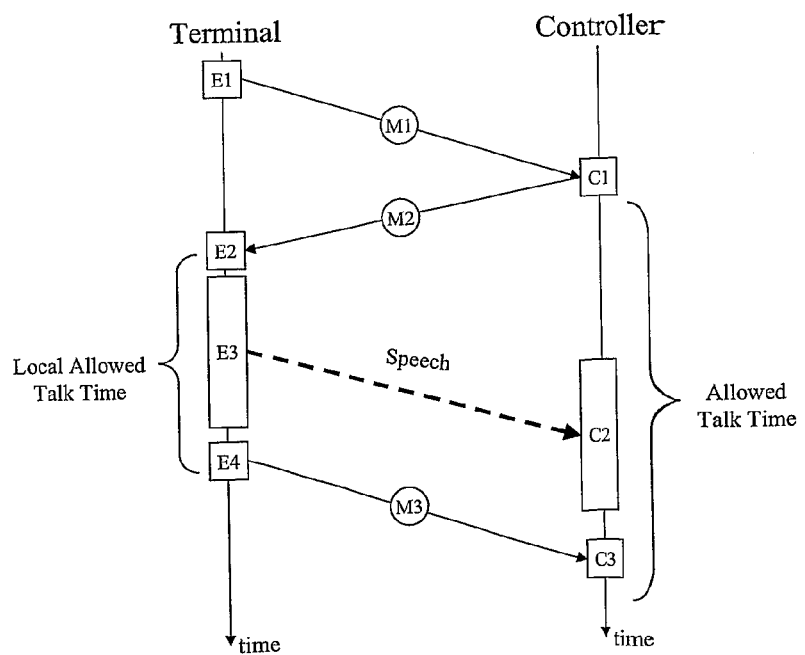
FIG. 20 illustrates a fourth embodiment.

A fourth embodiment will now be described with reference to FIG. 20. The sequence of events illustrated in FIG. 20 is as follows, referring to parts and messages labelled in the diagram. Each part labelled with an E prefix in FIG. 20 represents means at the terminal for performing the functions described below with reference to that part. Each part labelled with a C prefix in FIG. 20 represents means at the controller for performing the functions described below with reference to that part. This embodiment shows an example sequence where message repetition is not used or it does not occur.

1. E1 of FIG. 20

When the user requests the right to speak, the terminal sends the request for the right to speak to the controller.

2. M1 of FIG. 20

The request message is transported to the controller.

3. C1 of FIG. 20

When the controller receives the request and grants the right to speak to the user it starts the timer to control the allowed talk time with the value of the total allowed talk time (Tatt) adjusted upwards to accommodate the latencies. The controller calculates the aggregate downlink and uplink latency adjustment (Addown+up) as described as described below following the description relating to FIG. 27. The allowed talk timer is set to (Tatt+Addown+up) when it is started.

The controller responds to the terminal with a message that the right to speak is granted. In this message it includes the value of the total allowed talk time (Tatt).

Including the total allowed talk time in the right to speak granted message is novel.

4. M2 of FIG. 20

The granted message is transported to the terminal. This message includes the new total allowed talk time value (Tatt).

5. E2 of FIG. 20

When the terminal receives the message that the right to speak is granted it typically provides an indication to the user and makes ready to receive speech from the user and to send the speech to the controller. The terminal starts a local allowed talk timer (Latt) at that time. The value of that timer is equal to the value of the total allowed talk time received in M2.

This handling of the local allowed talk timer is novel.

6. E3 of FIG. 20

The terminal receives user's speech and sends to the controller. The terminal runs the local allowed talk timer. Based on this timer the terminal would typically indicate to the user the remaining allowed talk time.

7. C2 of FIG. 20

The controller receives the user's speech and forwards it to other participants in the communication. The controller runs the allowed talk timer.

8. E4 of FIG. 20

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

The above handling is novel.

9. M3 of FIG. 20

The release message is transported to the controller.

10. C3 of FIG. 20

When the controller receives the message to release the right to speak it stops the allowed talk timer. Since the release message is received prior to expiry of the allowed talk timer the controller does not apply any penalty.

Figure 21:
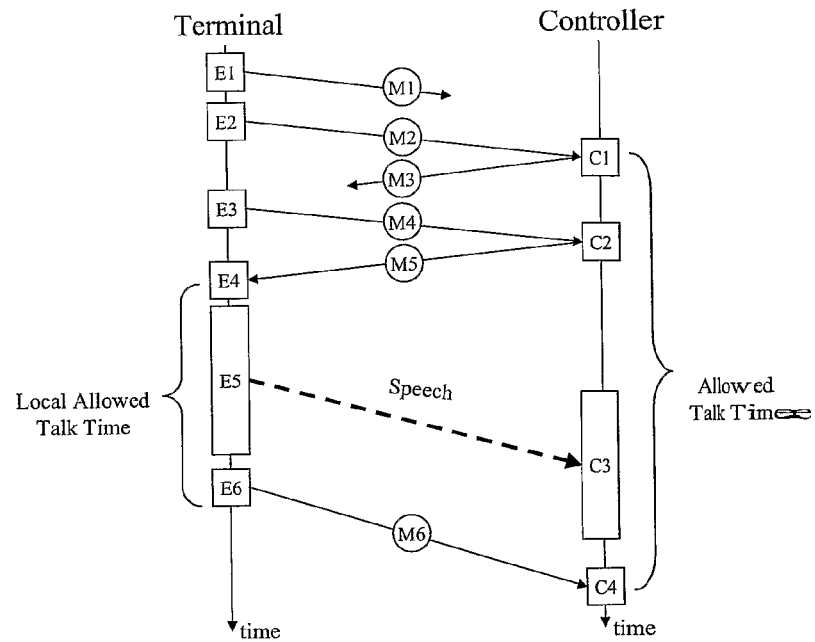
FIG. 21 illustrates a fifth embodiment.

A fifth embodiment will now be described with reference to FIG. 21. The sequence of events illustrated in FIG. 21 is as follows, referring to parts and messages labelled in the diagram. Each part labelled with an E prefix in FIG. 21 represents means at the terminal for performing the functions described below with reference to that part. Each part labelled with a C prefix in FIG. 21 represents means at the controller for performing the functions described below with reference to that part. The message sequence illustrated in FIG. 21 shows an example of message loss; it will be appreciated that this is merely an illustration of one possible message sequence arising from message loss, and other sequences could also result from such message loss or mis-sequencing.

1. E1 of FIG. 21

When the user requests the right to speak, the terminal sends the request for the right to speak to the controller. The terminal starts a re-transmission timer for the request.

Note that the terminal may use this request message to estimate the latencies as described below with reference to FIGS. 25 to 27.

2. M1 of FIG. 21

The request message is transmitted by the terminal, and in this example sequence lost on the way to the controller.

3. E2 of FIG. 21

The request re-transmission timer fires in the terminal, which triggers the terminal to re-send the request for the right to speak. The terminal re-starts the request re-transmission timer.

Note that the terminal may use this request message to estimate the latencies as described below with reference to FIGS. 25 to 27.

4. M2 of FIG. 21

The re-transmitted request message is transported successfully to the controller.

5. C1 of FIG. 21

When the controller receives the request and grants the right to speak to the user it starts the timer to control the allowed talk time with the value of the total allowed talk time (Tatt). It responds to the terminal with a message that the right to speak is granted. In this message it includes the current value of the allowed talk timer (Catt), which at this point is equal to the total allowed talk time. Including the current allowed talk time in the right to speak granted message is novel.

6. M3 of FIG. 21

The granted message is transmitted by the controller and in this example sequence lost on the way to the terminal. This message includes the new current allowed talk time value (Catt).

7. E3 of FIG. 21

The request re-transmission timer fires in the terminal, which triggers the terminal to re-send the request for the right to speak. The terminal re-starts the request re-transmission timer.

Note that the terminal may use this request message to estimate the latencies as described below with reference to FIGS. 25 to 27.

8. M4 of FIG. 21

The request message is transported successfully to the controller.

9. C2 of FIG. 21

When the controller receives the re-transmitted request it is aware that it has already granted the user the right to speak and that it has the allowed talk timer already running. The controller responds to the terminal with a message that the right to speak is granted. In this message it includes the current value of the allowed talk timer (Catt), which at this point has already decremented since it started. Including the current allowed talk time in the right to speak granted message is novel.

Note that the controller would not normally re-start the allowed talk timer at this point in order to protect itself from fraudulent terminal behaviour.

Note that in the normal operation of the controller the controller could have decided to give the right to speak to another user in the connection between C1 and C2. Since this is not important to the operation, this case is not described here, but it would be understood by the person skilled in the art without further explanation.

10. M5 of FIG. 21

The granted message is transported successfully to the terminal. This message includes the new current allowed talk time value (Catt).

Note that the terminal may use this granted message to estimate the latencies as described below with reference to FIGS. 25 to 27.

11. E4 of FIG. 21

When the terminal receives the message that the right to speak is granted it typically provides an indication to the user and makes ready to receive speech from the user and to send the speech to the controller. The terminal stops the request re-transmission timer. The terminal starts a local allowed talk timer (Latt) at this time.

The value of the local allowed talk timer is set to the value of the current allowed talk time received in M5 adjusted down to accommodate the aggregate downlink and uplink latencies, calculated as described below following the description relating to FIG. 27, as follows:

$$Latt = Catt - Ad_{down+up}$$

This handling of the local allowed talk timer is novel.

12. E5 of FIG. 21

The terminal receives user's speech and sends to the controller. The terminal runs the local allowed talk timer. Based on this timer the terminal would typically indicate to the user the remaining allowed talk time.

13. C3 of FIG. 21

The controller receives the user's speech and forwards it to other participants in the communication. The controller runs the allowed talk timer.

14. E6 of FIG. 21

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

The above handling is novel.

15. M6 of FIG. 21

The release message is transported to the controller.

16. C3 of FIG. 21

When the controller receives the message to release the right to speak it stops the allowed talk timer. Since the release message is received prior to expiry of the allowed talk timer the controller does not apply any penalty.

Figure 22:
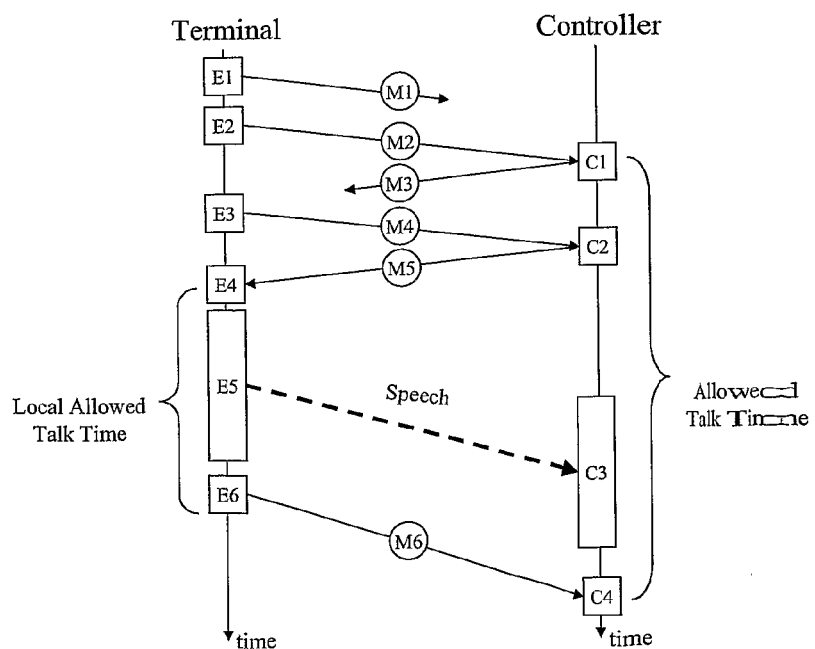
FIG. 22 illustrates a sixth embodiment.

A sixth embodiment will now be described with reference to FIG. 22. The sequence of events illustrated in FIG. 22 is as follows, referring to parts and messages labelled in the diagram. Each part labelled with an E prefix in FIG. 22 represents means at the terminal for performing the functions described below with reference to that part. Each part labelled with a C prefix in FIG. 22 represents means at the controller for performing the functions described below with reference to that part. The message sequence illustrated in FIG. 22 shows an example of message loss; it will be appreciated that this is merely an illustration of one possible message sequence arising from message loss, and other sequences could also result from such message loss or mis-sequencing.

1. E1 of FIG. 22

When the user requests the right to speak, the terminal sends the request for the right to speak to the controller. The terminal starts a re-transmission timer for the request.

2. M1 of FIG. 22

The request message is transmitted by the terminal, and in this example sequence lost on the way to the controller.

3. E2 of FIG. 22

The request re-transmission timer fires in the terminal, which triggers the terminal to re-send the request for the right to speak. The terminal re-starts the request re-transmission timer.

4. M2 of FIG. 22

The re-transmitted request message is transported successfully to the controller.

5. C1 of FIG. 22

When the controller receives the request and grants the right to speak to the user it starts the timer to control the allowed talk time with the value of the total allowed talk time (Tatt) adjusted upwards to accommodate the latencies. The controller calculates the aggregate downlink and uplink latency adjustment (Addown+up) as described as described below following the description relating to FIG. 27. The allowed talk timer is set to (Tatt+Addown+up) when it is started.

The controller responds to the terminal with a message that the right to speak is granted. In this message it includes the value of the current allowed talk time (Catt) set to the value of Tatt.

Including the current allowed talk time in the right to speak granted message and making the latency adjustment is novel.

6. M3 of FIG. 22

The granted message is transmitted by the controller and in this example sequence lost on the way to the terminal. This message includes the new current allowed talk time value (Catt).

7. E3 of FIG. 22

The request re-transmission timer fires in the terminal, which triggers the terminal to re-send the request for the right to speak. The terminal re-starts the request re-transmission timer.

8. M4 of FIG. 22

The request message is transported successfully to the controller.

9. C2 of FIG. 22

When the controller receives the re-transmitted request it is aware that it has already granted the user the right to speak and that it has the allowed talk timer already running. The controller responds to the terminal with a message that the right to speak is granted. In this message it includes the current allowed talk time (Catt) calculated by deducting the Addown+up adjustment used in step C1 from the current value of the allowed talk timer, which at this point has already decremented since it started. Including the current allowed talk time (Catt) in the right to speak granted message is novel.

Note that the controller would not normally re-start the allowed talk timer at this point in order to protect itself from fraudulent terminal behaviour.

Note that in the normal operation of the controller the controller could have decided to give the right to speak to another user in the connection between C1 and C2. Since this is not important to the operation, this case is not described here, but it would be understood by the person skilled in the art without further explanation.

10. M5 of FIG. 22

The granted message is transported successfully to the terminal. This message includes the new current allowed talk time value (Catt).

11. E4 of FIG. 22

When the terminal receives the message that the right to speak is granted it, typically provides an indication to the user and makes ready to receive speech from the user and to send the speech to the controller. The terminal stops the request re-transmission timer. The terminal starts the local allowed talk timer. The value of that timer is set to the value of the current allowed talk time received in M5.

This handling of the local allowed talk timer is novel.

12. E5 of FIG. 22

The terminal receives user's speech and sends to the controller. The terminal runs the local allowed talk timer. Based on this timer the terminal would typically indicate to the user the remaining allowed talk time.

13. C3 of FIG. 22

The controller receives the user's speech and forwards it to other participants in the communication. The controller runs the allowed talk timer.

14. E6 of FIG. 22

When the local allowed talk timer fires, indicating the end of the talk session, the terminal would preferably indicate this event to the user. Possibly based on user input or pre-configured preference or automatically the terminal may then stop receiving user's speech and sending it to the controller in which case it sends to the controller the message to release the right to speak.

The above handling is novel.

15. M6 of FIG. 22

The release message is transported to the controller.

16. C3 of FIG. 22

When the controller receives the message to release the right to speak it stops the allowed talk timer. Since the release message is received prior to expiry of the allowed talk timer the controller does not apply any penalty.

Figure 23:
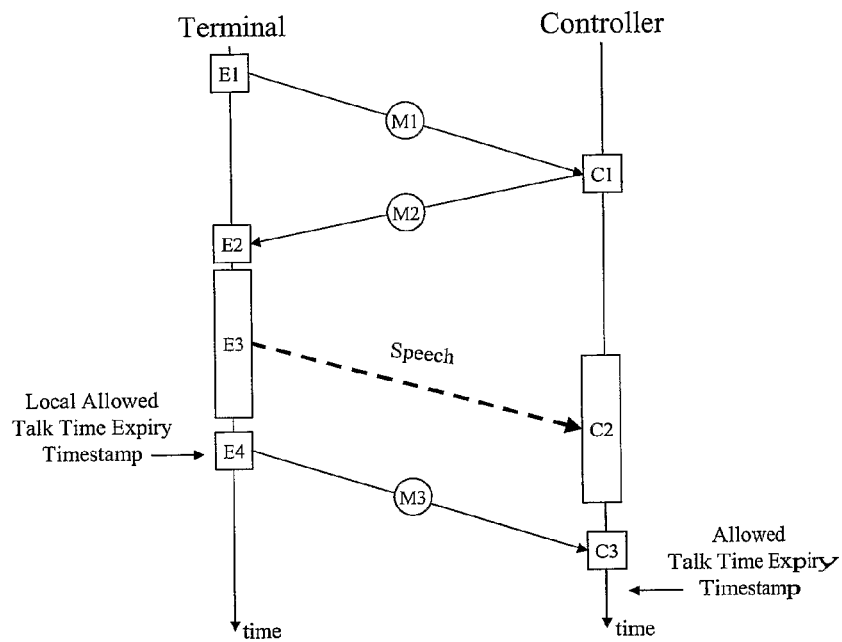
FIG. 23 illustrates a seventh embodiment.

A seventh embodiment will now be described with reference to FIG. 23. The sequence of events illustrated in FIG. 23 is as follows, referring to parts and messages labelled in the diagram. Each part labelled with an E prefix in FIG. 23 represents means at the terminal for performing the functions described below with reference to that part. Each part labelled with a C prefix in FIG. 23 represents means at the controller for performing the functions described below with reference to that part. This embodiment shows an example sequence where message repetition is not used or it does not occur.

1. E1 of FIG. 23

When the user requests the right to speak, the terminal sends the request for the right to speak to the controller.

2. M1 of FIG. 23

The request message is transported to the controller.

3. C1 of FIG. 23

When the controller receives the request and grants the right to speak to the user it determines the timestamp of when the allowed talk time will expire. It responds to the terminal with a message that the right to speak is granted. In this message it includes the timestamp of the expiry of the allowed talk time. Including the allowed talk time expiry timestamp in the right to speak granted message is novel.

4. M2 of FIG. 23

The granted message is transported to the terminal. This message includes the new allowed talk time expiry timestamp (Atstmp).

5. E2 of FIG. 23

When the terminal receives the message that the right to speak is granted it typically provides an indication to the user and makes ready to receive speech from the user and to send the speech to the controller.

The terminal sets a local allowed talk expiry timestamp (Ltstmp). The value of the local timestamp is set to the allowed talk time expiry timestamp received in M2 adjusted down to accommodate the uplink latency, the adjustment value calculated as described below following the description relating to FIG. 27, as follows $$Ltstmp=Atstmp-Adup$$

This handling of the local allowed expiry timestamp is novel.

6. E3 of FIG. 23.

The terminal receives user's speech and sends to the controller. Based on the local allowed expiry timestamp the terminal would typically indicate to the user the remaining allowed talk time.

7. C2 of FIG. 23

The controller receives the user's speech and forwards it to other participants in the communication. The controller runs the allowed talk timer.

7. E4 of FIG. 23

When the local allowed talk expiry timestamp is reached the terminal would typically indicate this event to the user. Possibly based on user input or pre-configured preference or automatically the terminal may then stop receiving user's speech and sending it to the controller in which case it sends to the controller the message to release the right to speak.

The above handling is novel.

8. M3 of FIG. 23

The release message is transported to the controller.

9. C3 of FIG. 23

The controller receives the message to release the right to speak. Since the release message is received prior to expiry of the allowed talk time the controller does not apply any penalty.

Figure 24:
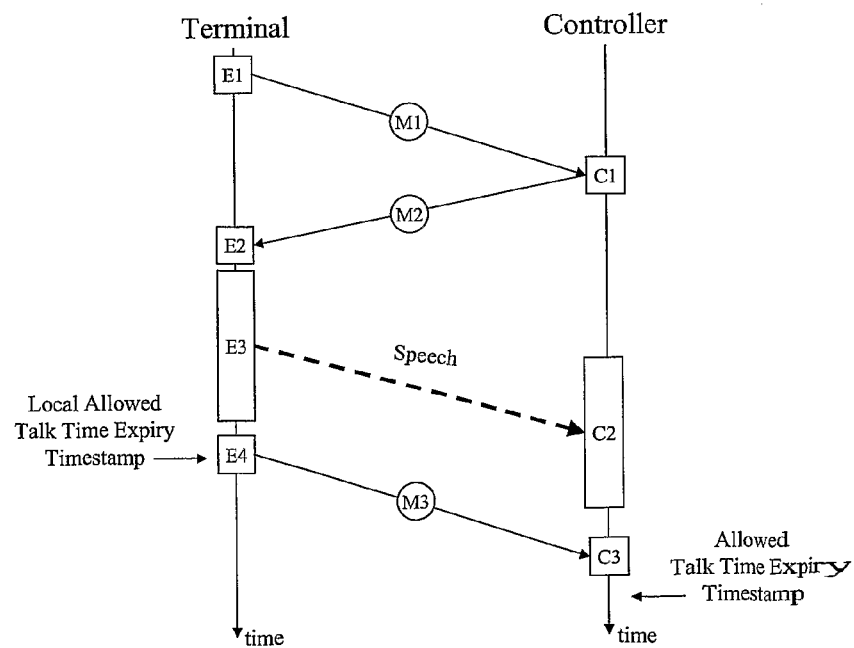
FIG. 24 illustrates an eighth embodiment.

An eighth embodiment will now be described with reference to FIG. 24. The sequence of events illustrated in FIG. 24 is as follows, referring to parts and messages labelled in the diagram. Each part labelled with an E prefix in FIG. 24 represents means at the terminal for performing the functions described below with reference to that part. Each part labelled with a C prefix in FIG. 24 represents means at the controller for performing the functions described below with reference to that part. This embodiment shows an example sequence where message repetition is not used or it does not occur.

1. E1 of FIG. 24

When the user requests the right to speak, the terminal sends the request for the right to speak to the controller.

2. M1 of FIG. 24

The request message is transported to the controller.

3. C1 of FIG. 24

When the controller receives the request and grants the right to speak to the user the controller determines the timestamp of when the allowed talk time will expire at the controller (Ctstmp). The Ctstmp timestamp is calculated by adding the total allowed talk time (Tatt) to the current time and adding the uplink latency adjustment value (Adup) calculated as described below following the description relating to FIG. 27, as follows:

$$Ctstmp=current\ time+Tatt+Adup$$

The controller responds to the terminal with a message that the right to speak is granted. In this message it includes the timestamp of the expiry of the allowed talk time (Atstmp). The Atstmp timestamp is calculated by adding the total allowed talk time (Tatt) to the current time, as follows:

$$Atstmp=current\ time+Tatt$$

Including the allowed talk time expiry timestamp (Atstmp) in the right to speak granted message is novel.

4. M2 of FIG. 24

The granted message is transported to the terminal. This message includes the new allowed talk time expiry timestamp (Atstmp).

5. E2 of FIG. 24

When the terminal receives the message that the right to speak is granted it typically provides an indication to the user and makes ready to receive speech from the user and to send the speech to the controller.

The terminal sets a local allowed talk expiry timestamp (Ltstmp). The value of the local timestamp is set to the allowed talk time expiry timestamp received in M2, as follows $$Ltstmp=Atstmp$$

This handling of the local allowed expiry timestamp is novel.

6. E3 of FIG. 24

The terminal receives user's speech and sends to the controller. Based on the local allowed expiry timestamp the terminal would typically indicate to the user the remaining allowed talk time.

7. C2 of FIG. 24

The controller receives the user's speech and forwards it to other participants in the communication. The controller runs the allowed talk timer.

8. E4 of FIG. 24

When the local allowed talk expiry timestamp is reached the terminal would typically indicate this event to the user. Possibly based on user input or pre-configured preference or automatically the terminal may then stop receiving user's speech and sending it to the controller in which case it sends to the controller the message to release the right to speak.

The above handling is novel.

9. M3 of FIG. 24

The release message is transported to the controller.

10. C3 of FIG. 24

The controller receives the message to release the right to speak. Since the release message is received prior to expiry of the allowed talk time the controller does not apply any penalty.

The above-described first to eighth embodiments are merely examples, and many more possibilities would be apparent to the person skilled in the art. The parts shown in and described with reference to FIGS. 6 to 16 can be considered to be "building blocks" from which various combinations can be built, with the first to eighth embodiments representing just eight of the possible combinations. For example, it is also the case where the controller operates according to the first regime described above, making latency adjustment with re-transmission. Below is summarised the possible combinations and how they relate to the eight embodiments already described; the claims are to be interpreted as covering all these possibilities. The skilled person would readily understand how to implement those combinations not explicitly described in the above embodiment.

1. Regime 1 (on speech)
   a. Type A (Tatt)
      i. Method A (controller makes latency adjustment)
         a. no re-transmission (FIG. 18, embodiment 2)
         b. re-transmission (no explicit embodiment described)
      ii. Method B (terminal makes latency adjustment)
         a. no re-transmission (no explicit embodiment described)
         b. re-transmission (FIG. 17, embodiment 1)
2. Regime 2 (on grant)
   a. Type A (Tatt)
      i. Method A (controller makes latency adjustment)
         a. no re-transmission (FIG. 20, embodiment 4)
         b. re-transmission (no explicit embodiment described)
      ii. Method B (terminal makes latency adjustment)
         a. no re-transmission (FIG. 19, embodiment 3)
         b. re-transmission (no explicit embodiment described)
   b. Type B (Catt)
      i. Method A (controller makes latency adjustment)
         a. no re-transmission (no explicit embodiment described)
         b. re-transmission (FIG. 22, embodiment 6)
      ii. Method B (terminal makes latency adjustment)
         a. no re-transmission (no explicit embodiment described)
         b. re-transmission (FIG. 21, embodiment 5)
   c. Type C (Timestamp)
      i. Method A (controller makes latency adjustment)
         a. no re-transmission (FIG. 24, embodiment 8)
         b. re-transmission (no explicit embodiment described)
      ii. Method B (terminal makes latency adjustment)
         a. no re-transmission (FIG. 23, embodiment 7)
         b. re-transmission (no explicit embodiment described)

Methods will now be described for estimating the latencies referred to in the above description of several embodiments. In these methods, latencies are estimated in the terminal based on the time measurement of control messages sent between the terminal and the controller.

A first method for estimating the latency is described with reference to FIG. 25, for the case of no message repetition. This is particularly applicable to systems where reliable transport is used for control messages. The sequence of events is as follows.

1. E1 of FIG. 25

When the terminal sends a request to which a response is expected from the controller (e.g. the request message for the right to speak) the terminal records the local time when it sends this initial request (Lrt-1). Recording the local time of the initial request is novel.

2. M1 of FIG. 25

The request message is transported to the controller.

3. C1 of FIG. 25

The controller receives the request and sends the responds (e.g. the right to speak granted message in response to the request for the right to speak message).

4. M2 of Figure X

The response message is transported to the terminal.

5. E2 of FIG. 25

The terminal receives the response message. The terminal records the time when it has received the response message (Lst). The terminal estimates the request-response roundtrip delay to be:

$$Rrt = Lst - Lrt\text{-}1$$

The terminal may keep a history of Rrt values. The terminal selects the most recent Rrt value or the one from the history it finds to be the most representative for the connection. The selected Rrt is denominated Rrt-s.

The Rrt-s is the base for the estimation of the aggregate uplink and downlink latency (Lup+down). The terminal estimates the aggregate latency to be:

$$Lup{+}down = Rrt\text{-}s$$

The estimation of the latency is novel.

A second method for estimating the latency is described with reference to FIG. 26, for the case of message repetition. This is therefore particularly applicable, but not limited, to systems where unreliable transport is used for control messages. The sequence of events is as follows. The message sequence illustrated in FIG. 26 shows an example of message loss; it will be appreciated that this is merely an illustration of one possible message sequence arising from message loss, and other sequences could also result from such message loss or mis-sequencing.

1. E1 of FIG. 26

When the terminal sends a request to which a response is expected from the controller (e.g. the request the right to speak message) the terminal records the local time when it sends this initial request (Lrt-1). The terminal starts a re-transmission timer awaiting the response from the controller. Recording the local time of the initial request is novel.

Note that the terminal records the local time for every initial and re-sent request message separately. To make this point clear a notation is used here by adding an incrementing sequence number to the Lrt, where Lrt-1 is used for the initial request.

2. M1 of FIG. 26

The request message is transmitted by the terminal, and in this example sequence lost on the way to the controller.

3. E2 of FIG. 26

The request re-transmission timer fires in the terminal, which triggers the terminal to re-send the request message. The terminal re-starts the request re-transmission timer. The terminal records the local time when it re-sends the request (Lrt-2). Recording the local time of the re-sent request is novel.

4. M2 of FIG. 26

The re-transmitted request message is transported successfully to the controller.

5. C1 of FIG. 26

The controller receives the request and sends the responds (e.g. the right to speak granted message in response to the request for the right to speak message).

6. M3 of FIG. 26

The response message is transmitted by the controller and in this example sequence lost on the way to the terminal.

7. E3 of FIG. 26

The request re-transmission timer fires in the terminal, which triggers the terminal to re-send the request for the right to speak. The terminal re-starts the request re-transmission timer. The terminal records the local time when it re-sends the request (Lrt-3). Recording the local time of the re-sent request is novel.

8. M4 of FIG. 26

The request message is transported successfully to the controller.

9. C2 of FIG. 26

The controller receives the request and sends the responds (e.g. the right to speak granted message in response to the request for the right to speak message).

10. M5 of FIG. 26

The response message is transported successfully to the terminal.

11. E4 of FIG. 26

The terminal receives the response message. The terminal records the time when it has received the response message (Lst). The terminal then estimates the request-response roundtrip delay in accordance with the following, which will be described with reference to the flowchart of FIG. 27.

In a first part P1, the terminal selects applicable Lrt (denominated Lrt-s) according to the following steps.

It is determined in step Q1 whether the terminal is able to correlate the response message to the request message. If yes, then the terminal selects the Lrt-<x> time pertinent to the request in step S4. If no, then the terminal proceeds to step Q2.

At step Q2, one of two methods can be performed, an aggressive method or a conservative method. It is determined in step Q2 whether the aggressive method is to be performed.

If yes, and the aggressive method is to be performed, then it is determined in step Q3 whether (Lst—the most recent Lrt time denominated Lrt-<latest>) is below the shortest possible or reasonable roundtrip delay between the terminal and the controller. If yes, then in step S2 the previous Lrt time, i.e. Lrt-<latest−1>, is selected. If no, then the most recent Lrt-<latest> time is selected in step S3.

If no, and the conservative method is to be performed, then any Lrt between and including Lrt-1 and Lrt-<latest−2> is selected in step S1, depending on the degree of conservativeness, where Lrt-1 is the most conservative, and Lrt-<latest−2> is the least conservative.

In a second part P2, once Lrt has been selected, the terminal estimates in step R the request-response roundtrip delay to be:

$$Rrt = Lst - Lrt\text{-}s$$

The terminal may keep a history of Rrt values. The terminal selects the most recent Rrt value or the one from the history it finds to be the most representative for the connection. The selected Rrt is denominated Rrt-s.

The Rrt-s is the base for the estimation of the aggregate uplink and downlink latency (Lup+down). In step L, the terminal estimates the aggregate latency to be:

$$Lup+down = Rrt\text{-}s$$

The estimation of the latency is novel.

Methods will now be described for calculating the latency adjustment values referred to in the above description of several embodiments. Methods for calculating latency adjustment values in the controller will first be described, followed by methods for calculating latency adjustment values in the terminal.

The controller determines the uplink latency adjustment (Adup) value as follows.

If the controller has an estimate of the message transfer latency in the uplink direction (Lup), the adjustment value is calculated as:

$$Adup = Lup + \text{safety margin}$$

How the controller makes the estimate of Lup is not important to the operation; a suitable method would be readily apparent to the person skilled in the art. The value of the safety margin is at the discretion of the controller.

On the other hand, if the controller does not have an estimate of the message transfer latency in the uplink direction (Lup), the adjustment value is calculated as:

$$Adup = \text{safety margin}$$

The value of the safety margin is at the discretion of the controller.

The controller determines the aggregate downlink and uplink latency adjustment (Addown+up) value as follows.

If the controller has an estimate of the message transfer latency in the uplink direction (Lup) and downlink direction (Ldown), the adjustment value is calculated as:

$$Addown+up = Ldown + Lup + \text{safety margin}$$

How the terminal makes the estimate of Ldown and Lup is not important to the operation; a suitable method would be readily apparent to the person skilled in the art. The value of the safety margin is at the discretion of the terminal.

On the other hand, if the controller does not have an estimate of the message transfer latency in the uplink direction (Lup) and downlink direction (Ldown), the adjustment value is calculated as:

$$Addown+up = \text{safety margin}$$

The value of the safety margin is at the discretion of the controller.

The terminal determines the uplink latency adjustment (Adup) value as follows.

If the terminal has an estimate of the message transfer latency in the uplink direction (Lup), the adjustment value is calculated as:

$$Adup = Lup + \text{safety margin}$$

How the terminal makes the estimate of Lup is not important to the operation; a suitable method would be readily apparent to the person skilled in the art. The value of the safety margin is at the discretion of the terminal.

On the other hand, if the terminal has used a method of estimating the latencies described above with reference to FIGS. 25 to 27, it calculates the adjustment value as:

$$Adup = Lup + down$$

Otherwise, the terminal calculates the adjustment value as:

$$Adup = \text{safety margin}$$

The value of the safety margin is at the discretion of the terminal.

The terminal determines the aggregate downlink and uplink latency adjustment (Addown+up) value as follows.

If the terminal has an estimate of the message transfer latency in the uplink direction (Lup) and downlink direction (Ldown), the adjustment value is calculated as:

$$Addown+up = Ldown + Lup + \text{safety margin}$$

How the terminal makes the estimate of Ldown and Lup is not important to the operation; a suitable method would be readily apparent to the person skilled in the art. The value of the safety margin is at the discretion of the terminal.

On the other hand, if the terminal has used a method of estimating the latencies described above with reference to FIGS. 25 to 27, it calculates the adjustment value as:

Addown+up=Lup+down

Otherwise, the terminal calculates the adjustment value as:

Addown+up=safety margin

The value of the safety margin is at the discretion of the terminal.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method for use by a controller in a push to talk type service involving a terminal and the controller, the method being performed in response to the controller deciding to grant a talk burst to the terminal for an allowed talk time in response to a talk request received from the terminal, and the method comprising:
   sending to the terminal an indication of the allowed talk time for the granted talk burst, the indication being for use at the terminal to determine when it needs to send a release message to the controller in order to avoid a penalty being applied to the terminal by the controller if the release message is not received at the controller before expiry of the remaining allowed talk time monitored at the controller and to monitor the remaining allowed talk time during the granted talk burst;
   monitoring the remaining allowed talk time at the controller;
   receiving a release message sent from the terminal to the controller in response to expiry of the remaining allowed talk time monitored at the terminal; and
   applying the penalty to the terminal if the release message is not received at the controller before expiry of the remaining allowed talk time monitored at the controller.

2. A method as claimed in claim 1, comprising receiving the talk request at the controller and deciding whether to grant the talk request.

3. A method as claimed in claim 1, comprising determining the allowed talk time at the controller.

4. A method as claimed in claim 1, wherein the indication comprises timing information relating to the duration of the allowed talk time.

5. A method as claimed in claim 4, wherein the indication comprises timing information relating to the remaining duration of the allowed talk time at or near the time of sending the indication.

6. A method as claimed in claim 1, wherein the indication comprises timing information relating to the end of the allowed talk time.

7. A method as claimed in claim 6, wherein the terminal and controller have at least some degree of timing synchronization between them.

8. A method as claimed in claim 1, comprising sending a granted message from the controller to the terminal to indicate the granting of the talk request.

9. A method as claimed in claim 8, comprising including the indication in the granted message.

10. A method as claimed in claim 1, comprising monitoring the remaining allowed talk time at the terminal.

11. A method as claimed in claim 10, comprising monitoring the remaining allowed talk time at the terminal using an allowed talk timer.

12. A method as claimed in claim 11, comprising initializing the allowed talk timer at the terminal based on the received indication.

13. A method as claimed in claim 12, wherein the indication comprises timing information relating to the end of the allowed talk time, and comprising initializing the allowed talk timer at the terminal to watch for the end of the allowed talk time based on the received timing information.

14. A method as claimed in claim 12, wherein the indication comprises timing information relating to the duration of the allowed talk time, and comprising initializing the allowed talk timer at the terminal to measure a duration of time based on the received timing information.

15. A method as claimed in claim 11, comprising starting the allowed talk timer at the terminal substantially at the same time as starting to send talk burst data to the controller.

16. A method as claimed in claim 11, comprising sending a granted message from the controller to the terminal to indicate the granting of the talk request, and starting the allowed talk timer at the terminal in response to receipt of the granted message.

17. A method as claimed in claim 1, comprising monitoring the remaining allowed talk time at the controller using an allowed talk timer.

18. A method as claimed in claim 17, wherein the indication comprises timing information relating to the end of the allowed talk time, and comprising initializing the allowed talk timer at the controller to watch for the end of the allowed talk time.

19. A method as claimed in claim 17, wherein the indication comprises timing information relating to the duration of the allowed talk time, and comprising initializing the allowed talk timer at the controller to measure a duration of time.

20. A method as claimed in claim 1, comprising starting the allowed talk timer at the controller in response to receipt of talk burst data from the terminal.

21. A method as claimed in claim 1, comprising starting the allowed talk timer at the controller at substantially the same time as sending the granted message.

22. A method as claimed in claim 10, comprising sending a granted message from the controller to the terminal to indicate the granting of the talk request, and starting the allowed talk timer at the controller at substantially the same time as sending the granted message.

23. A method as claimed in claim 1, comprising sending the talk request from the terminal to the controller.

24. A method as claimed in claim 23, comprising re-sending the talk request following a predetermined period of time during which no response to the talk request is received from the controller.

25. A method as claimed in claim 24, comprising sending a granted message from the controller to the terminal to indicate the granting of the talk request, and re-sending the granted message following receipt of the re-sent talk request.

26. A method as claimed in claim 25, wherein the indication in the re-sent grant message is determined from the remaining allowed talk time monitored at the controller at or near the time of re-sending the grant message.

27. A method as claimed in claim 1, comprising indicating the remaining allowed talk time monitored at the terminal to a user of the terminal.

28. A method as claimed in claim 1, comprising indicating expiry of the remaining allowed talk time monitored at the terminal to a user of the terminal.

29. A method as claimed in claim 1, comprising sending a release message from the terminal to the controller in response to expiry of the remaining allowed talk time monitored at the terminal.

30. A method as claimed in claim 1, comprising making a latency adjustment to the remaining talk time monitored at the terminal.

31. A method as claimed in claim 30, comprising making the latency adjustment to the remaining talk time monitored at the terminal in dependence upon an estimation of at least part of a roundtrip delay between the terminal and the controller.

32. A method as claimed in claim 1, comprising making a latency adjustment to the remaining talk time monitored at the controller.

33. A method as claimed in claim 32, comprising making the latency adjustment to the remaining talk time monitored at the controller in dependence upon an estimation of at least part of a roundtrip delay between the terminal and the controller.

34. A method as claimed in claim 31, comprising estimating the at least part of a roundtrip delay at the terminal.

35. A method as claimed in claim 31, comprising estimating the at least part of a roundtrip delay at the controller.

36. A method as claimed in claim 31, comprising sending the talk request from the terminal to the controller, and using the talk request in the estimation of the at least part of a roundtrip delay.

37. A method as claimed in claim 31, comprising sending a granted message from the controller to the terminal to indicate the granting of the talk request, and using the granted message in the estimation of the at least part of a roundtrip delay.

38. A method as claimed in claim 37, comprising sending the talk request from the terminal to the controller, using the talk request in the estimation of the at least part of a roundtrip delay, and estimating the at least part of a roundtrip delay based on a measurement of the time difference between sending the talk request and receiving the granted message.

39. A method as claimed in claim 38, comprising re-sending the talk request following a predetermined period of time during which no response to the talk request is received from the controller and, in the case where the talk request is sent more than once, selecting one of these talk requests as a basis for the measurement.

40. A method as claimed in claim 38, comprising estimating the at least part of a roundtrip delay based on a plurality of such measurements made at different respective times.

41. A method as claimed in claim 31, comprising sending a release message from the terminal to the controller in response to expiry of the remaining allowed talk time monitored at the terminal, and using the release message in the estimation of the at least part of a roundtrip delay.

42. A method as claimed in claim 32, wherein the remaining talk time monitored at the controller is increased according to the latency adjustment.

43. A method as claimed in claim 30, wherein the remaining talk time monitored at the terminal is decreased according to the latency adjustment.

44. A method as claimed in claim 30, comprising starting the allowed talk timer at the controller at substantially the same time as sending the granted message, and wherein the latency adjustment is an aggregate downlink and uplink latency adjustment.

45. A method as claimed in claim 30, comprising monitoring the remaining allowed talk time at the controller using an allowed talk timer, and wherein the indication comprises timing information relating to the end of the allowed talk time, and comprising initializing the allowed talk timer at the controller to watch for the end of the allowed talk time, and wherein the latency adjustment is an uplink latency adjustment.

46. A method as claimed in claim 30, comprising starting the allowed talk timer at the controller in response to receipt of talk burst data from the terminal, and wherein the latency adjustment is an uplink latency adjustment.

47. A method as claimed in claim 1, in which "talk" is replaced by "data transfer", and the data transferred in the data transfer burst comprises for example speech data and/or another type of data.

48. A method for use by a terminal in a push to talk type service involving the terminal and a controller the method being performed in response to the controller deciding to grant a talk burst to the terminal for an allowed talk time in response to a talk request received from the terminal, and the method comprising:
   receiving from the controller an indication of the allowed talk time for the granted talk burst;
   using the indication to determine when the terminal needs to send a release message to the controller in order to avoid a penalty applied by the controller to the terminal if the release message is not received at the controller before expiry of the remaining allowed talk time monitored at the controller;
   monitoring the remaining allowed talk time at the terminal during the granted talk burst; and
   sending a release message from the terminal to the controller in response to expiry of the remaining allowed talk time monitored at the terminal.

49. A controller for use in a push to talk type service, comprising means for performing a method as claimed in claim 1.

50. A terminal for use in a push to talk type service, comprising means for performing a method as claimed in claim 48.

51. A non-transistory computer program product which, when run on an apparatus, causes the apparatus to carry out a method as claimed in claim 1.

52. A controller for use in a push to talk type service involving a terminal and the controller, comprising computer-implemented circuitry, which in response to the controller deciding to grant a talk burst to the terminal for an allowed talk time in response to a talk request received from the terminal, configured to:
   send to the terminal an indication of the allowed talk time for the granted talk burst, the indication being for use at the terminal to determine when it needs to send a release message to the controller in order to avoid a penalty being applied to the terminal by the controller if the release message is not received at the controller before expiry of the remaining allowed talk time monitored at the controller and to monitor the remaining allowed talk time during the granted talk burst;

monitor the remaining allowed talk time at the controller;

receive a release message sent from the terminal to the controller in response to expiry of the remaining allowed talk time monitored at the terminal; and apply the penalty to the terminal if the release message is not received at the controller before expiry of the remaining allowed talk time monitored at the controller.

53. A terminal for use in a push to talk type service involving the terminal and a controller, comprising computer-implemented circuitry, which in response to the controller deciding to grant a talk burst to the terminal for an allowed talk time in response to a talk request received from the terminal, is configured to:

receive from the controller an indication of the allowed talk time for the granted talk burst;

use the indication to determine when the terminal needs to send a release message to the controller in order to avoid a penalty applied by the controller to the terminal if the release message is not received at the controller before expiry of the remaining allowed talk time monitored at the controller;

monitor the remaining allowed talk time at the terminal during the granted talk burst; and send a release message from the terminal to the controller in response to expiry of the remaining allowed talk time monitored at the terminal.

* * * * *